US006686405B1

United States Patent
Kawahara et al.

(10) Patent No.: US 6,686,405 B1
(45) Date of Patent: Feb. 3, 2004

(54) PROCESS FOR PRODUCING ETHYLENE-VINYL ALCOHOL COPOLYMER RESIN, PROCESS FOR PRODUCING PELLETS AND RESIN PELLETS

(75) Inventors: Takaharu Kawahara, Okayama (JP); Hiroshi Kawai, Okayama (JP); Toshio Tuboi, Okayama (JP); Yukihiro Ohara, Okayama (JP); Masao Hikasa, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 239 days.

(21) Appl. No.: 09/621,271

(22) Filed: Jul. 20, 2000

(30) Foreign Application Priority Data

| Jul. 23, 1999 | (JP) | 11-240274 |
| Dec. 15, 1999 | (JP) | 11-355947 |
| Dec. 15, 1999 | (JP) | 11-355948 |
| Dec. 15, 1999 | (JP) | 11-355949 |
| Dec. 15, 1999 | (JP) | 11-355950 |
| Dec. 15, 1999 | (JP) | 11-355951 |

(51) Int. Cl.[7] .................. C08K 5/52; C08K 5/524; C08K 5/55; C08K 5/101
(52) U.S. Cl. .................. 524/127; 524/183; 524/284; 524/503; 525/62; 526/331; 528/486; 528/498
(58) Field of Search .................. 525/62; 526/331; 528/486, 498; 524/127, 183, 503, 284

(56) References Cited

U.S. PATENT DOCUMENTS

| 5,118,743 A | 6/1992 | Yonezu et al. |
| 5,146,822 A | 9/1992 | Noda et al. |
| 5,322,866 A | 6/1994 | Mayer et al. |
| 5,744,547 A | 4/1998 | Moritani et al. |
| 5,866,655 A | 2/1999 | Fujiwara et al. |
| 5,948,447 A | 9/1999 | McHaney et al. |
| 6,288,165 B1 | 9/2001 | Moritani et al. |

FOREIGN PATENT DOCUMENTS

| EP | 0 408 503 A2 | 1/1991 |
| EP | 0 892 006 | 1/1999 |
| EP | 0 892 006 A2 * | 1/1999 |
| EP | 0 892 817 | 1/1999 |
| EP | 0 930 339 | 7/1999 |
| EP | 0 930 339 A1 * | 7/1999 |
| EP | 0 937 557 A1 | 8/1999 |
| JP | 49-20615 | 5/1974 |
| JP | 55-12108 | 1/1980 |
| JP | 55-19242 | 5/1980 |
| JP | 57-34148 | 2/1982 |
| JP | 64-66262 | 3/1989 |
| JP | 3-61507 | 3/1991 |
| JP | 11-58500 | 3/1999 |
| JP | 11-58501 | 3/1999 |
| WO | WO 97/38025 | 10/1997 |
| WO | WO 99/05213 | 2/1999 |
| WO | WO 99/12714 | 3/1999 |

OTHER PUBLICATIONS

U.S. patent application Ser. No. 09/874,301, filed Jun. 6, 2001, pending.
U.S. patent application Ser. No. 09/892,694, filed Jun. 28, 2001, pending.
U.S. patent application Ser. No. 09/892,543, filed Jun. 28, 2001, pending.
U.S. patent application Ser. No. 09/922,693, filed Aug. 7, 2001, pending.
U.S. patent application Ser. No. 09/621,271, filed Jul. 20, 2000, pending.

* cited by examiner

*Primary Examiner*—Robert Deshon Harlan
(74) *Attorney, Agent, or Firm*—Oblon, Spivak, McClelland, Maier & Neustadt, P.C.

(57) ABSTRACT

A process for producing an ethylene-vinyl alcohol copolymer resin, including feeding EVOH into an extruder, keeping the temperature of the melting resin in the extruder at 70 to 170° C., adjusting the amount of water in the extruder so that the water content right after being discharged from the extruder is 5 to 40 weight %, and extruding out the EVOH resin. The extruded EVOH resin is cut into EVOH pellets. Thereby, it is possible to obtain resin pellets in which no spherocrystals are observed in the center of the cross section of the resin when the cross section is observed by the use of a polarization microscope, or no lubricant is contained in the resin pellets, and the angle of repose is 23° or less when the resin pellets are laminated. Thus, it is possible to provide an ethylene-vinyl alcohol copolymer (EVOH) resin pellet having a reduced discharging load to the environment and capable of being fed into an extruder smoothly without being blocked, extruding stability, and thermal stability (long-run property).

25 Claims, 11 Drawing Sheets

PROCESS FOR PRODUCING ETHYLENE-VINYL ALCOHOL COPOLYMER RESIN, PROCESS FOR PRODUCING PELLETS AND RESIN PELLETS

FIELD OF THE INVENTION

The present invention relates to a process for producing an ethylene-vinyl alcohol copolymer (hereinafter, also referred to as "EVOH") with good thermal stability and a low production cost, a process for producing resin pellets, and resin pellets obtained by the process.

BACKGROUND OF THE INVENTION

EVOH is widely used for food packaging, because it has a high gas barrier property and excellent resistance properties against oil and organic solvents, aroma retention property, transparency, and the like. For food packaging, various kinds of molding processes are employed. Examples of such molding processes includes an extrusion molding process for films, a blow molding process for bottles, a vacuum molding process for various kinds of packages, and the like. Such molding processes start by feeding resin pellets into a hopper, etc. of an extruder.

However, there is a problem that conventional EVOH resin pellets tend to be blocked in the hopper when the resins are fed into the extruder, and thus the resins are not fed into the extruder smoothly.

Furthermore, since the melting temperature should be 200° C. or more at the time of the molding process, unless the polymer is provided with an improved thermal property, the polymer is deteriorated at the time of melt molding. As a result, fish eye or hard spots are formed, thus deteriorating the quality of the products. Therefore, it is necessary to provide the polymer with an improved thermal stability.

Hitherto, in order to provide EVOH with such a property, a method of adding a minor component such as an acid material and/or a metal salt, etc. is well known. For improving the long-run property and the appearance deterioration caused by the gel and hard spots, etc., for example, JP 64-66262A discloses an EVOH of a composition that contains 0.0005–0.05 weight % (based on metal) of a metal salt belonging to group II of the periodic table, 0.002–0.2 weight % of acid having a pKa of 3.5 or more and a boiling point of 180° C. or more, and 0.01–0.2 weight % of acid having a pKa of 3.5 or more and a boiling point of 120° C. or less and which exhibits a certain flowability.

The following are examples of a well-known method for obtaining EVOH pellets to which the minor component is added as mentioned above.

(1) A method of spraying an aqueous solution of the minor component to EVOH pellets, blending thereof with a Henschel mixer, and then drying thereof (JP 55-12108A).

(2) A method of mixing a minor component in the form of a powder to EVOH pellets, and dry-blending thereof with a super mixer (JP57-34148A).

(3) A method of immersing EVOH pellets in an aqueous solution containing a minor component and removing water from EVOH pellets, followed by drying (JP64-66262A).

(4) A method of adjusting the water content of EVOH pellets to 20 to 80 weight %, and bringing the EVOH pellets into contact with an aqueous solution of at least one compound selected from the group consisting of a boron compound, acetate and a phosphoric acid compound (WO/99/05213A).

However, in the method explained in the above (1) or (2), the minor components cannot be contained in EVOH pellets sufficiently homogeneously, and it is difficult to control the added amount of the minor component. Thus, it is difficult to obtain products with a stable quality. Furthermore, the method explained in the above (3) or (4) is advantageous in that it is easy to control the amount of the minor component contained in the EVOH pellets by adjusting the concentration of the solution. However, when the EVOH pellets treated by these methods are molded by melt extrusion, the motor torque and torque variation of the extruder are increased. Therefore, in general, it is necessary to add a lubricant to EVOH resin composition at the time of extrusion. However, the EVOH resin composition is used preferably for the applications of food packaging, etc., and therefore, the use of such lubricants is not necessarily preferable from the sanitary viewpoint. Thus, it has been demanded that the lubricants be reduced or avoided.

The EVOH pellets treated by the method (3) or (4) are generally obtained as follows. A methanol solution of saponified EVOH is allowed to precipitate in the form of a strand in a coagulation bath of a water/methanol mixed solution. The obtained strand is cut into pellets. However, in the case of EVOH of an ethylene content of less than 20 mol % and/or EVOH having a saponification degree of less than 95 mol %, strands are not precipitated easily in the coagulation bath, and furthermore, cutting errors or contamination of fine powders easily occur, thus making it difficult to produce pellets stably. Occasionally, strands may not be precipitated, and paste-like EVOH is precipitated as a crumb-like product coagulated in an indeterminate shape. However, it is difficult to mix the minor component homogeneously into the crumb-like precipitates processed by the methods (3) or (4). Thus, it is not possible to obtain products of a stable quality.

On the other hand, even if EVOH of an ethylene content of 20 mol % or more and/or the saponification degree of 95 mol % or more is used, when the strands are precipitated at high speed in order to improve the productivity, strands are not precipitated stably. Thus, it is difficult to produce pellets stably. Consequently, it was not possible to obtain products of a stable quality by the method (3) or (4).

Furthermore, from the viewpoint of the production process, in the conventional method in which the EVOH pellets are immersed in a treating solution containing an acid material and/or a metal salt, a treating bath or a treating tower for the immersion treatment is required. The treating solution used in such a treating bath or treating tower is required to be thrown away after use or recycled in order to add an appropriate amount of acid materials and/or metal salts again, after the treatment of EVOH, because the acid materials and/or metal salts are consumed after the treatment.

It is not preferable to throw away the treating solution in view of the influence on environment. Therefore, in general, the treating solution is disposed of by way of a wastewater treating plant. Furthermore, when the treating solution is collected and reused, in order to obtain products having a stable quality, apparatus for adding acid materials and/or metal salts again and apparatus for removing impurities such as oligomer, etc. in the treating solution are required.

As mentioned above, the conventional methods suffer from a problem that large-scale treatment apparatus and a long treatment time are required, and that the production cost is high.

Furthermore, an example of a wet extrusion includes a melt extrusion molding performed at certain energy (JP11-

58500A), and melt extrusion molding by controlling the temperature of cylinder to a certain temperature (JP 11-58501A).

However, the above-mentioned conventional methods require complex operations. Therefore, the methods are not preferable as a treating process for producing pellets of EVOH resin.

Furthermore, when pellets of EVOH resin are fed to an extruder, melted and then subjected to a molding process, if residue of a saponification catalyst contained in the resin at the time of production remains in the polymer, the thermal stability may be deteriorated.

Hitherto, in order to remove the residue of the saponification catalyst from the polymer, resin pellets are placed in a washing container and brought into contact in the solid state with a washing water (water) so as to diffuse and extract residue from the inside of the resin pellets to the outside (JP55-19242B).

However, the above-mentioned conventional method requires a long time and a large washing apparatus and space.

Furthermore, in the above-mentioned conventional method, a large amount of water is attached to the resin. Therefore, in order to eliminate the water, a hot-air drying using a dryer is required. In this case, there is a problem that pellets occasionally are melted and attached to each other depending upon the drying temperatures.

Furthermore, the conventional EVOH resin pellets are generally produced by a strand cutting method. That is, a strand (continuous stick-like product) is obtained by extruding a solution of resin from a metal mold into a poor solvent so as to precipitate, or a strand is obtained by extruding resins which are heated and melted and by cooling and solidifying thereof. Then, the obtained strand is cut into pellets having the constant size by using a strand cutter (JP 3-61507A). However, since the strand cutting method requires a process for continuously precipitating or cooling and solidifying the extruded resin, it is difficult to cut a large amount of resin with high accuracy in a short time. Therefore, there is a problem that strands cut off easily. In particular, EVOH of a low ethylene content or EVOH of a low saponification degree suffers from the above-mentioned problem significantly, because the precipitating rate for allowing the strand to be precipitated from the solution is slow.

Furthermore, when feeding water-containing EVOH resin pellets into the extruder, if a large amount of water is attached to the surface of the resin pellets, some problems arise. For example, pellets form bridges in the hopper; pellets are blocked in a feeder; water vapor is generated in the extruder, so that pellets of EVOH resin are melted and attached to each other; and the like. Specific problems include, bridges are formed in the hopper in the feeder, and thus raw materials are not fed to the extruder sufficiently. Another problem is that surface water separated in the feeder is fed to the extruder to generate water vapor at the lower part of the hopper, so that the raw material pellets are melted and attached to each other. As a result, the raw material resins are not fed to the extruder sufficiently. In particular, in this case of the water-containing EVOH, melting point of EVOH is lowered, the pellets are likely to be melted and attached to each other at the lower part of the hopper. Furthermore, insufficient feeding of the raw materials may change the feeding amount into the extruder. Thus, there arise some problems, for example, the adding amount of acid-metal salt becomes unstable, deteriorating the thermal stability. Therefore, the improvement in methods for effectively feeding water-containing EVOH resin pellets into an extruder has been demanded.

SUMMARY OF THE INVENTION

It is a first object of the present invention to provide a process for producing EVOH, which reduces a discharge load to the environment, can be fed into an extruder smoothly without being blocked, and is excellent in extruding stability and thermal stability (long-run property), a process for producing resin pellets therefrom, and resin pellets produced by the above-mentioned process.

The second object of the present invention is to provide a process for producing EVOH resin and a process for producing pellets thereof, wherein residue of the saponification catalyst contained at the time of production of the EVOH resin can be removed effectively, and the resin can be washed in a small space.

The third object of the present invention is to provide a method for removing water from a water-containing EVOH resin by using an extruder, and a process for producing EVOH resin, in which additives can be added into EVOH resin effectively.

The fourth object of the present invention is to provide a method for cutting a water-containing and molten state EVOH resin right after being discharged from the extruder, thereby effectively cutting a large amount of polymers in a short time with high accuracy.

In order to attain the above-mentioned objects, according to a first production process of the present invention, a process includes feeding EVOH into an extruder, keeping the temperature of the melting resin in the extruder at 70–170° C., and adjusting an amount of water so that the water content of EVOH right after being discharged is 5–40 weight %.

According to a second production process of the present invention, at least one additive selected from carboxylic acid, a boron compound, a phosphoric acid compound, an alkali metal salt, and an alkali earth metal salt is added into the extruder. It is preferable that the additives are added to EVOH in a water-containing state and molten state.

According to a third production process of the present invention, the water supplied to the extruder is a washing water for washing the EVOH resin, the resin is washed by the washing water, the washing water is discharged in a liquid state from at least one place downstream from a washing water supply portion, and residue of the saponification catalyst contained at the time of production of the resin is removed.

According to a fourth production process of the present invention, a method for removing water removes water in the form of liquid water or vapor water from a water-containing EVOH resin from at least one portion of the extruder.

According to a fifth production process of the present invention, the EVOH resin is cut into pellets after being discharged from the extruder and dried until the water content becomes 1 weight % or less.

According to a first EVOH resin pellet of the present invention, no spherocrystals are observed in the center of the cross section of the resin pellet when the cross section is observed by a polarization microscope (with a magnification of 600).

According to a second EVOH resin pellet of the present invention, an angle of repose is 23° or less when the resin pellets are piled.

DETAILED DESCRIPTION OF THE INVENTION

Figure 1:
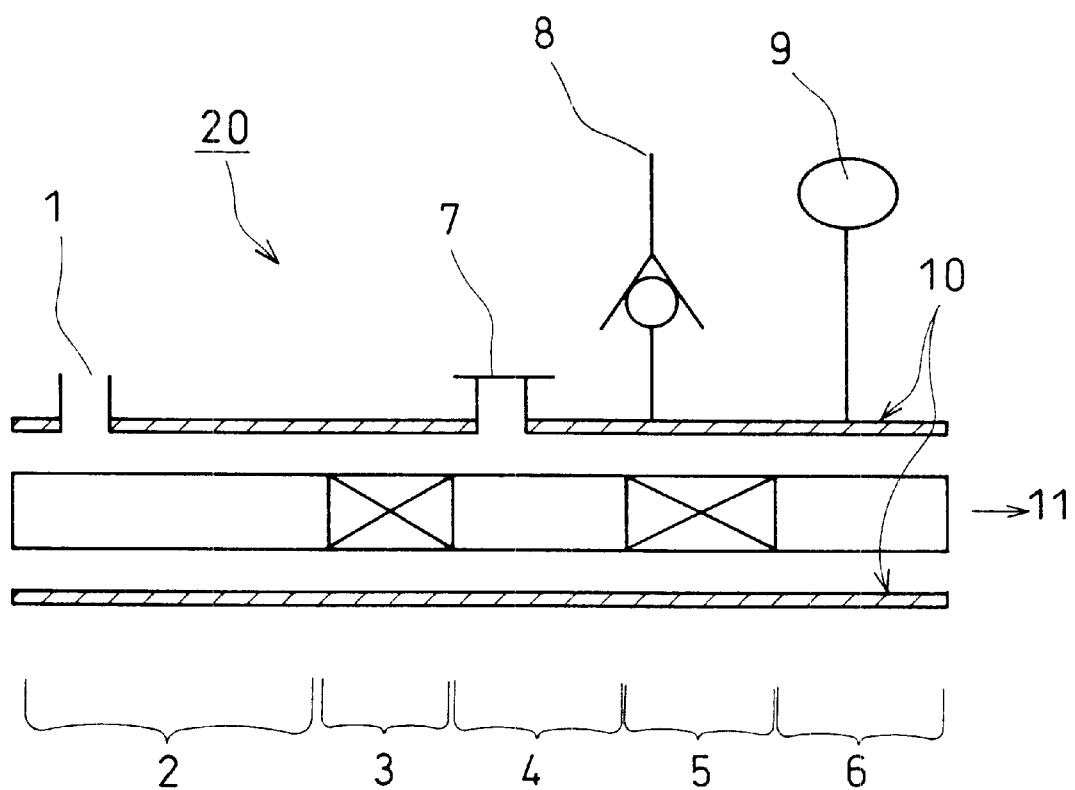
FIG. 1 is a schematic view to illustrate an outline of a process using an extruder used in Examples 1 to 4 according to the present invention.

According to the present invention mentioned above, by performing a wet extrusion using an extruder, it is possible to provide pellets of EVOH resin, which reduces a discharge load to the environment, can be fed into an extruder smoothly without being blocked, are in excellent in extruding stability and thermal stability (long-run property). Furthermore, it is possible to provide EVOH resin pellets in which the polymer is prevented from being deteriorated.

According to the first production process of the present invention, it is preferable that an ethylene content of EVOH is 3–70 mol %. Furthermore, it is preferable that the saponification degree of EVOH is 80–100 mol %. Furthermore, it is preferable that the water content of EVOH to be fed to the extruder is 0.5–70 weight %. Furthermore, it is preferable that water is supplied/removed to/from the extruder so that the water content of the resin right after being discharged from the extruder is preferably 5–40 weight %, and more preferably 15–30 weight %. Furthermore, the temperature of resin in the extruder is preferably 70–170° C., and more preferably 90–140° C.

It is preferable in the second production process of the present invention that at least one additive selected from carboxylic acid, a boron compound, a phosphoric acid compound, an alkali metal salt and an alkali earth metal salt is added into the extruder. Thus, an excellent thermal property can be attained. Furthermore, among the additives, carboxylic acid having pKa at 25° C. of 3.5 or more is preferable. A preferable example of carboxylic acid is acetic acid or lactic acid.

It is preferable in the second production process of the present invention that additive is added into the water-containing and molten EVOH. Furthermore, it is preferable that the additive is added in the form of an aqueous solution. It is preferable that the extruder has a kneading portion. Furthermore, it is preferable that the additive is added at the kneading portion of the extruder. Furthermore, it is preferable that there are one or two adding portions.

It is preferable in the third production process of the present invention that the residue of the saponification catalyst contained in EVOH fed into the extruder is an alkali metal ion and that the content of the ion is 0.1–5 weight % based on metal. Furthermore, the washing water is an aqueous solution of acid having a pKa at 25° C. of 3.5 or more is preferable. Furthermore, it is preferable that the washing water is discharged by at least one means selected from a dewatering slit and a dewatering hole. Furthermore, after the washing water is discharged, preferably water is removed in the form of liquid water or vapor water to adjust the water content of the resin so that the water content of the resin right after being discharged from the extruder is 5–40 weight %, additive is added into the extruder, and then the resin composition is extruded from the extruder, followed by cutting. Furthermore, it is preferable that the content of alkali metal ions contained in the washed EVOH resin is 0.05 weight % or less based on metal.

It is preferable in the fourth production process of the present invention that the method for removing water uses at least one means selected from a dewatering slit and a dewatering hole. Furthermore, it is preferable that the water-containing EVOH is in a molten or semi-molten state.

It is preferable in the fifth production process of the present invention that the resin is cut in a molten state. Furthermore, it is preferable that a method of cutting the resin is at least one method selected from a hot-cut method and an under-water cut method. Furthermore, after the copolymer is cut, preferably it is dried so as to have a water content of 1 weight % or less.

It is preferable in the first to fifth production processes of the present invention that the method for feeding the pellet is a volumetric feeding method in which the pellet is fed into the extruder continuously at a constant amount by using a volumetric feeder.

Hereinafter, the present invention will be described by way of embodiments with reference to drawings. FIG. 1 is a schematic view to illustrate an outline of a process of a first embodiment according to the present invention. A water-containing EVOH is fed from a raw material feeding portion 1 of a twin screw extruder 20. EVOH, which is in a water-containing and a molten or semi-molten state, is fed forward by a full-flight screw 2, and kneaded at an inverted flight screw 3. At a vent cylinder 7, excess water is removed, and thus the water content is adjusted. Thereafter, EVOH is fed forward by a full-flight screw 4. A predetermined amount of additives are added into the extruder from a minor component adding portion 8. Then, EVOH is kneaded at an inverted flight screw 5, passes through a full-flight screw 6, is discharged from a discharge portion 11 and is pelletized downstream from the discharge opening 11. Reference numeral 9 denotes a temperature sensor for detecting and controlling temperature of EVOH, and 10 denotes a cylinder barrel.

Figure 3:
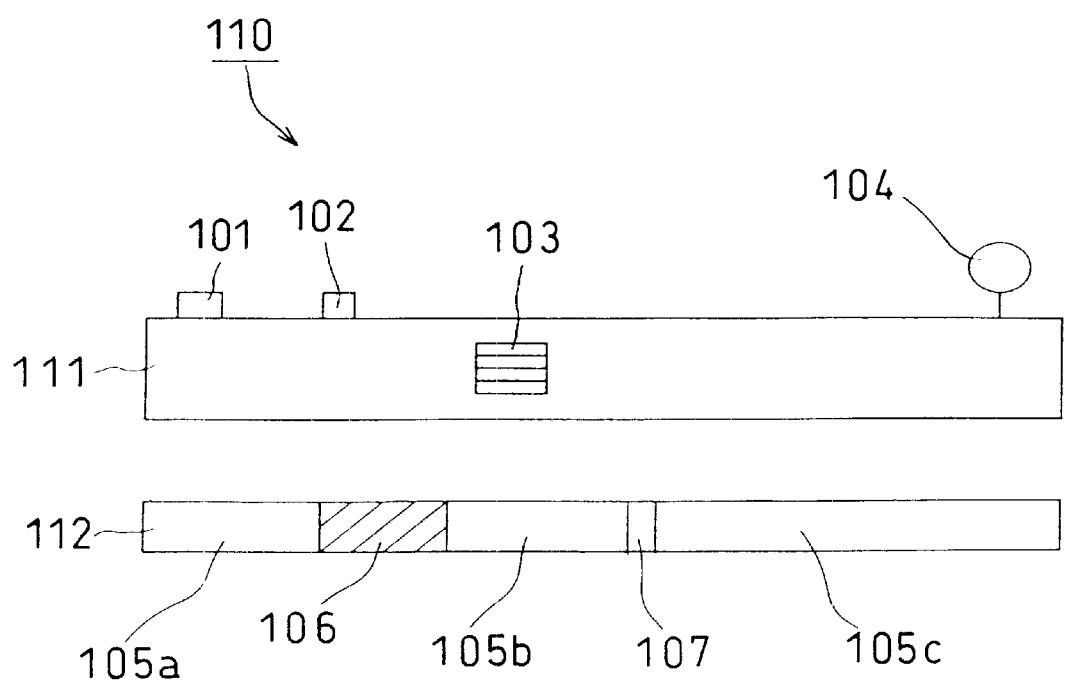
FIG. 3 is a schematic view to illustrate a washing method of Examples 5 to 10 in one embodiment according to the present invention.
Figure 4:
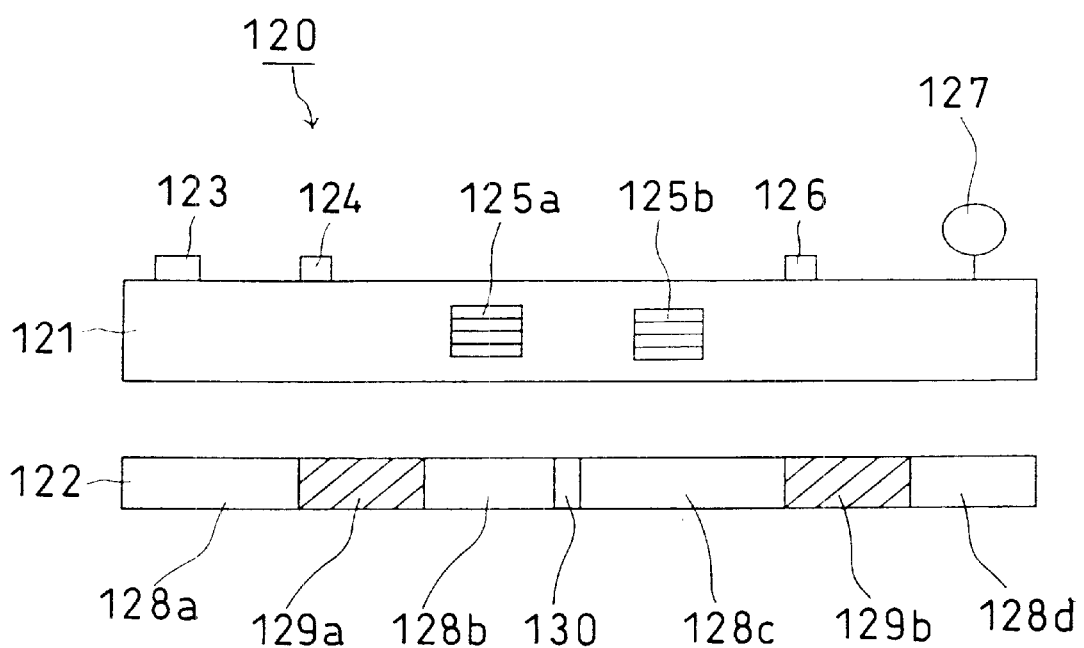
FIG. 4 is a schematic view to illustrate an outline of a process of adding a minor component after washing of Examples 5 to 10 in one embodiment according to the present invention.

Next, FIGS. 3 and 4 are schematic views to illustrate a washing method in the second embodiment according to the present invention. In FIG. 3, EVOH is fed from a raw material feeding portion 101 of a barrel 111 of a twin screw extruder 110. EVOH, which is in a water-containing and a molten or semi-molten state, is fed forward by a full-flight screw 105a of a screw 112 and supplied with water, which is a washing water, from a washing water supply portion 102. Next, EVOH is kneaded at an inverted flight screw 106, and fed forward by a full-flight screw 105b. Excess water is squeezed and removed from EVOH at a dewatering portion 103. At the time of removing the excess water, the residue of the saponification catalyst generated during the production process is washed and removed from EVOH. Thereafter, EVOH passes through a seal ring portion 107 and a full-flight screw 105c and then is discharged from a discharge portion (not shown). Reference numeral 104 denotes a temperature sensor for detecting and controlling the temperature of EVOH.

FIG. 4 is a schematic view to illustrate an outline of a process for adding a minor component after washing in one embodiment according to the present invention. EVOH is fed from a raw material feeding portion 123 of a barrel 121 of a twin screw extruder 120. EVOH, which is in a water-containing and a molten or semi-molten state, is fed forward by a full-flight screw 128a of a screw 122 and supplied with water, which is a washing water, from a washing water supply portion 124. Next, EVOH is kneaded at an inverted flight screw 129a, and is fed forward by a full-flight screw 128b. Excess water is squeezed out and removed from EVOH at a dewatering portion 125a. At the time of removing the excess water, the residue of the saponification catalyst generated during the production process is washed and removed from EVOH. Thereafter, EVOH passes through a seal ring portion 130 and a full-flight screw 128c, and then is further subjected to dewatering or degassing treatment at a dewatering portion 125b. Next, additives are added from a minor component adding portion 126, the resin is kneaded at an inverted flight screw 129b, passes through a full-flight screw 128d and then is discharged from a discharge portion (not shown). Reference numeral 127 denotes a temperature sensor for detecting and controlling the temperature of EVOH.

Figure 5:
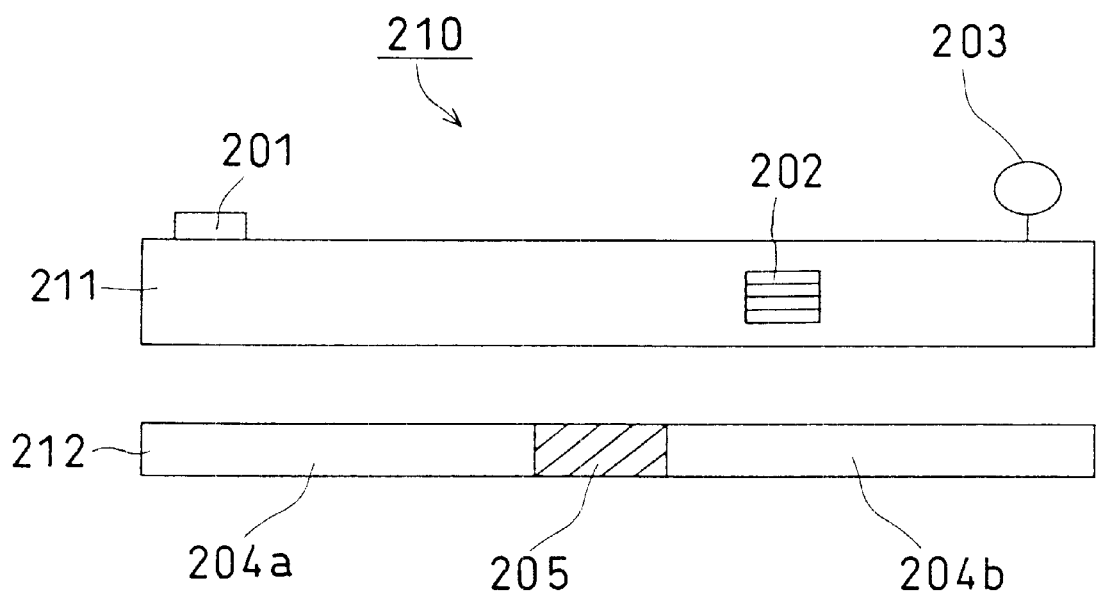
FIG. 5 is a schematic view to illustrate a method of removing water in the form of liquid water or water vapor of Examples 11 to 18 in one embodiment according to the present invention.
Figure 6:
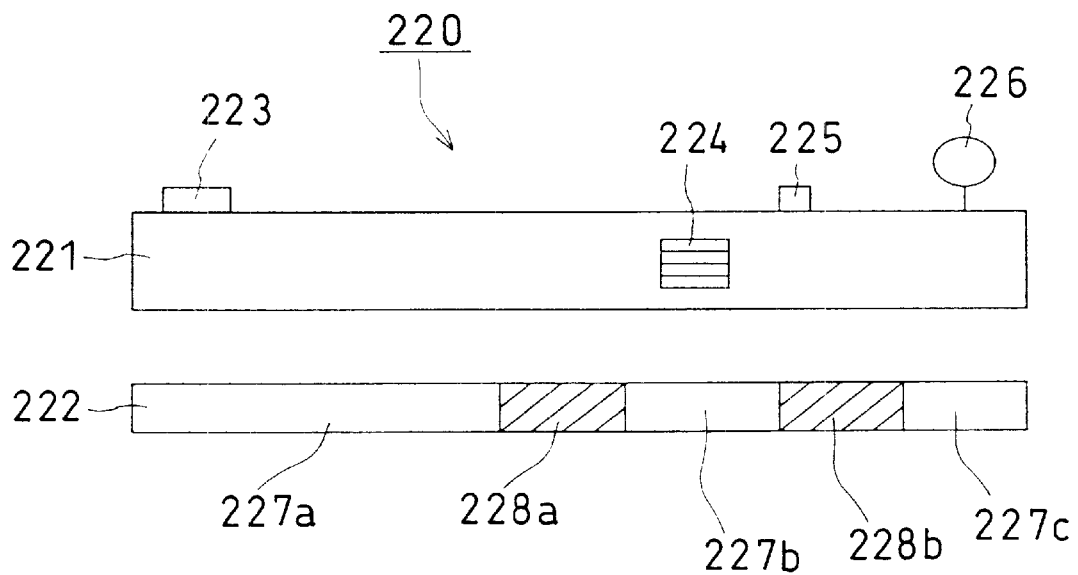
FIG. 6 is a schematic view to illustrate an outline of a process of adding a minor component after removing water in the form of liquid water or water vapor of Examples 11 to 18 in one embodiment according to the present invention.

FIGS. 5 and 6 are schematic views to illustrate a degassing dewatering method of the third embodiment according to the present invention. A water-containing EVOH is fed from a raw material feeding portion 201 of a barrel 211 of a twin screw extruder 210. EVOH, which is in a water-containing and a molten or semi-molten state, is fed forward by a full-flight screw 204a of a screw 212, and kneaded by an inverted flight screw 205. At a dewatering portion 202 including a dewatering slit and a dewatering hole, excess water is removed in the form of liquid water or water vapor, and thus the water content is adjusted. Thereafter, EVOH is fed forward by a full-flight screw 204b, and further fed to a discharge portion (not shown). Reference numeral 203 denotes a temperature sensor for detecting and controlling the temperature of EVOH.

FIG. 6 is a schematic view to illustrate an outline of a process of adding an additive after excess water is removed in the form of liquid water or water vapor in one embodiment according to the present invention. A water-containing EVOH is fed from a raw material feeding portion 223 of a barrel 221 of a twin screw extruder 220. EVOH, which is in a water-containing and a molten or semi-molten state, is fed forward by a full-flight screw 227a of a screw 222, and kneaded at an inverted flight screw 228a. At a dewatering portion 224 including a dewatering slit and a dewatering hole, excess water is removed in the form of liquid water or water vapor, and thus the water content is adjusted. Then, EVOH is fed forward by a full-flight screw 228b, and further fed to a discharge portion (not shown). Reference numeral 226 denotes a temperature sensor for detecting and controlling the temperature of EVOH.

Figure 7:
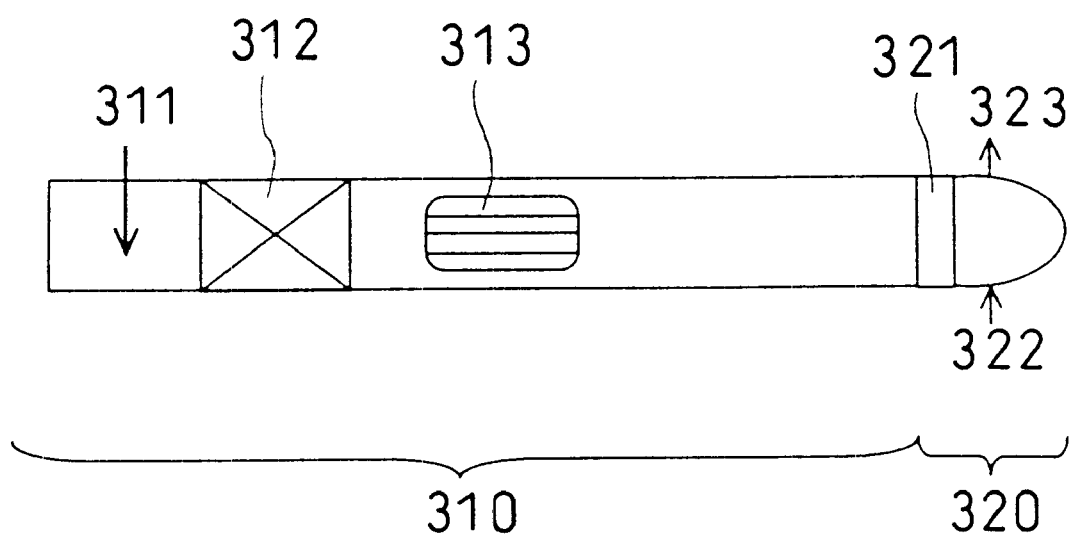
FIG. 7 is a schematic view to illustrate an outline of a process using an extruder used in Examples 19 to 21 according to the present invention.
Figure 8:
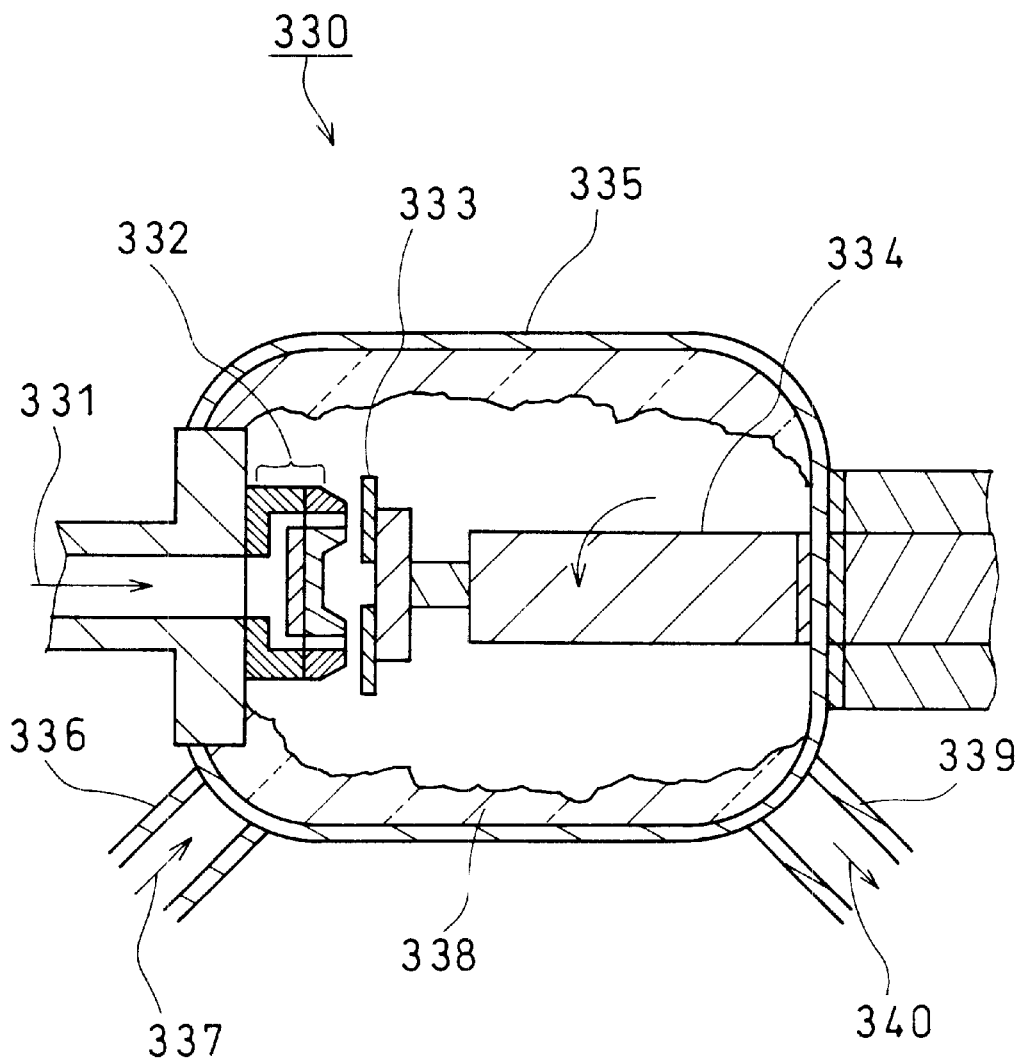
FIG. 8 is a schematic cross-sectional view showing how to cut resin by a hot-cut method in Examples 19 to 21 according to the present invention.
Figure 9:
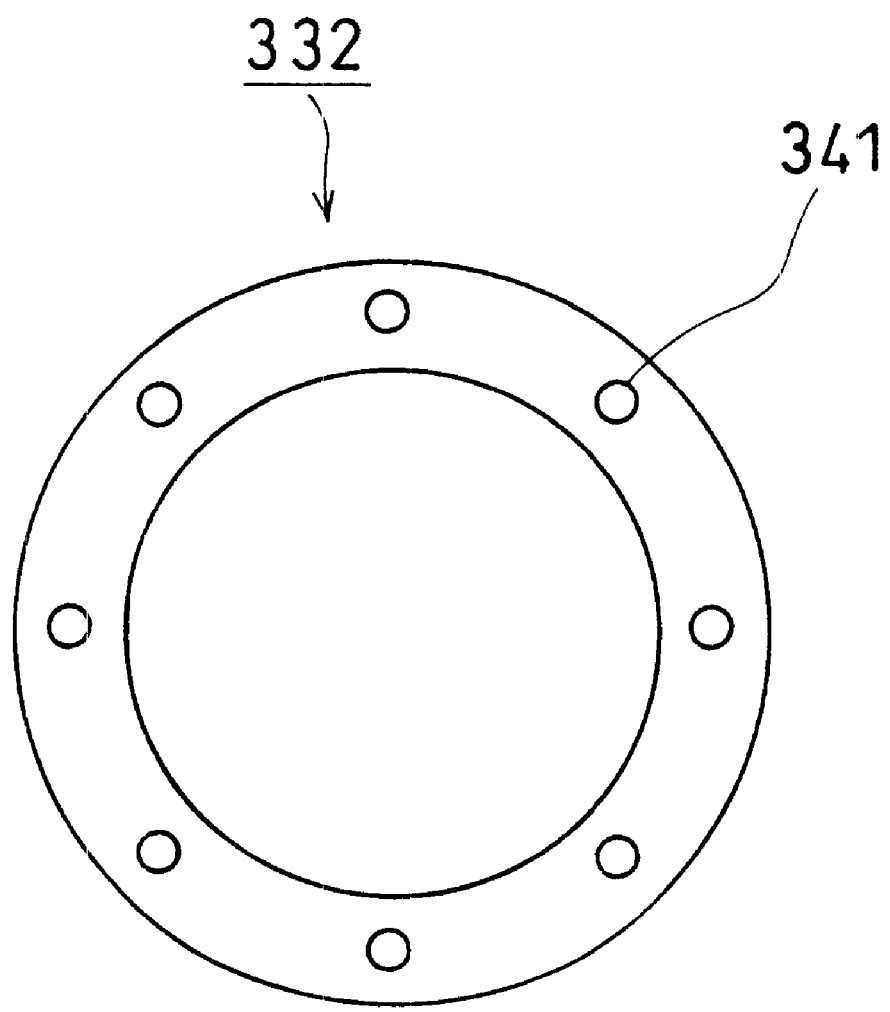
FIG. 9 is a front view showing a die of FIG. 8.

FIGS. 7 to 9 are schematic views to illustrate an outline of a process in a fourth embodiment according to the present invention. In FIG. 7, a water-containing EVOH is fed from a raw material feeding portion 311 of a twin screw extruder 310. EVOH, which is in a water-containing and a molten or semi-molten state, is fed forward, and kneaded at an inverted flight screw 312. The amount of water in EVOH is adjusted at a dewatering slit 313. Then, EVOH is fed forward to a discharge portion 321. The discharge portion 321 is equipped with a cutter 320 (which is illustrated in detail in FIGS. 8 and 9). A circulating water of the cutter is supplied from a cooling water supply portion 322, and the cooling water and the pellet are discharged from the pellet discharge portion 323.

FIG. 8 is a schematic cross-sectional view showing a cutting process by a hot cut method. Water-containing EVOH discharged from a discharge portion 331 of a twin-screw extruder is cut by the rotation of a rotation blade 333 right after the EVOH is extruded from a die 322. Reference numeral 334 denotes a rotation axis directly connected to a rotation blade 333. Cooling water 337 is supplied from a cooling water supply port 336 to a cutter box 335 to form a water membrane 338 therein. The water membrane 338 cools down the pellet right after cutting. The cooling water and the pellet 340 are discharged from a pellet discharge portion 339. FIG. 9 is a front view of a die 332. The water-containing EVOH is discharged from holes 341.

The cutting method in water (for example, an under-water cutting apparatus) is similar to the hot-cut method. The difference between them is that in the in-water cutting apparatus, cooling water substantially fills the cutter box 341.

Figure 10:
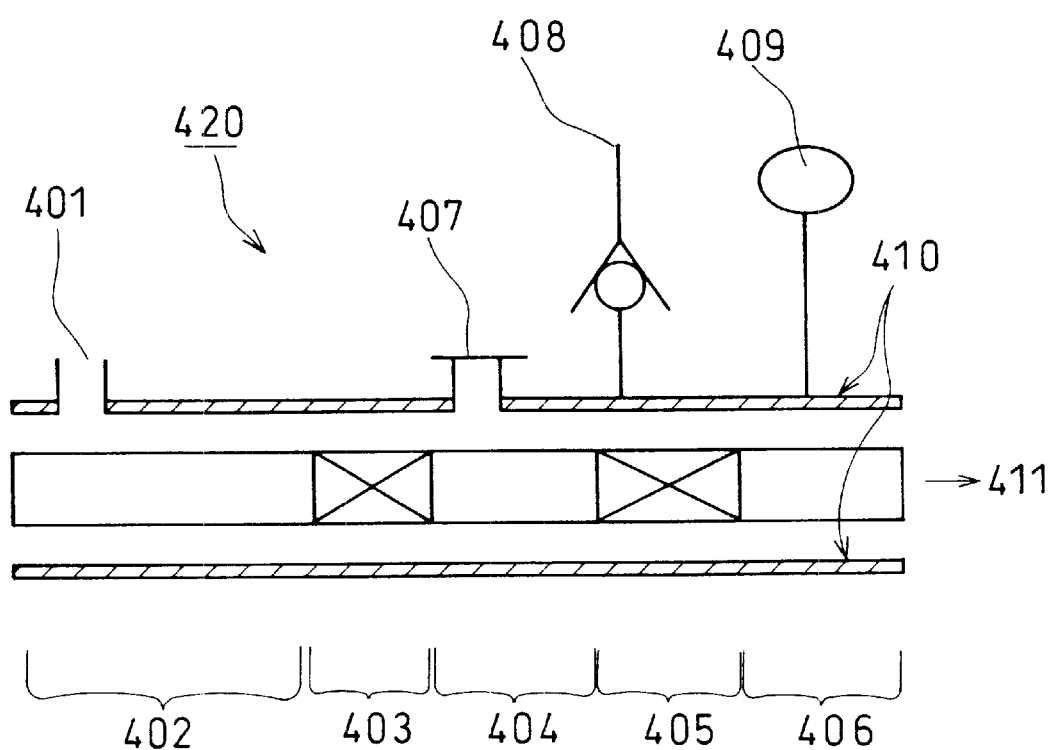
FIG. 10 is a schematic view to illustrate an outline of a process using an extruder used in Examples 22 to 23 according to the present invention.
Figure 11:
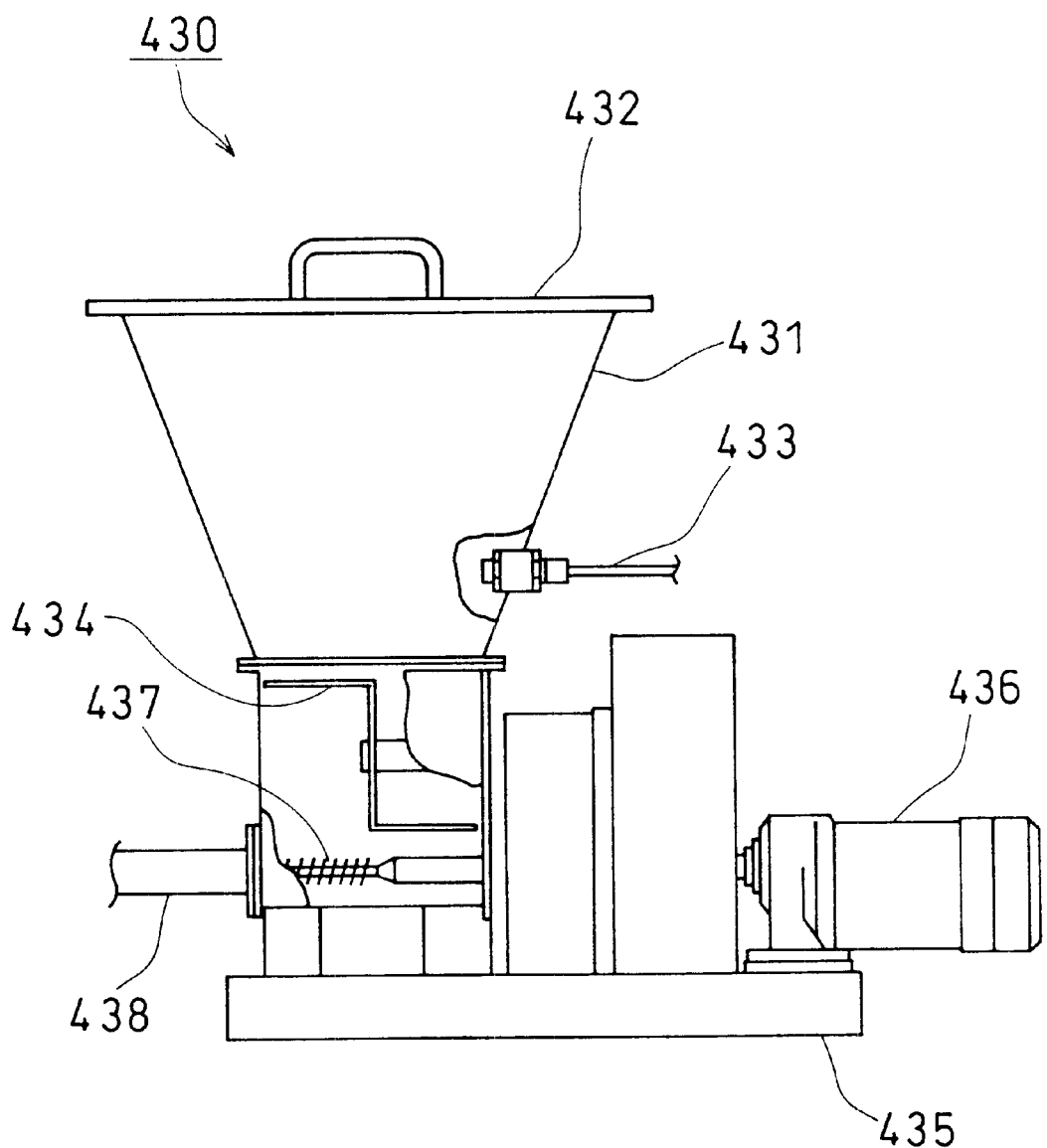
FIG. 11 is a cross-sectional partially cut-away view showing a hopper-feeder used in Examples 22 and 23 according to the present invention.

FIGS. 10 and 11 are schematic views to illustrate an outline of a process of the fifth embodiment according to the present invention. In FIG. 10, a water-containing EVOH is fed from a raw material feeding portion 401 of a twin screw extruder 420. EVOH, which is in a water-containing and a molten or semi-molten state, is fed forward by a full-flight screw 402, and kneaded at an inverted flight screw 403. At a vent cylinder portion 407, excess water is removed from EVOH, and thus the water content is adjusted. Thereafter, EVOH is fed forward by a full-flight screw 404, and a predetermined amount of additives is added into the extruder from a minor component adding portion 408. Then, EVOH is kneaded at an inverted flight screw 405, passes through a full-flight screw 406, is discharged from a discharge portion 411, and is pelletized downstream from the discharge portion 411. Reference numeral 409 denotes a temperature sensor for detecting and controlling temperature of EVOH and 410 denotes a cylinder barrel.

FIG. 11 is a cross-sectional partially cut-away view showing a hopper-feeder used in the process in one embodiment according to the present invention. The hopper-feeder 430 includes a hopper 431 containing resin pellets with a lid 432, a level switch 433 detecting the amount of resin pellets, a stirrer 434 preventing resin pellets from being bridged, a motor 436 for rotating a screw 437, a duct 438 for feeding resin into the extruder, and a base 435.

It is preferable that EVOH used in the present invention is one obtained by saponifying ethylene-vinyl ester copolymer. The content of ethylene is generally 3–70 mol %. From the viewpoint of providing molded articles having high gas-barrier property and excellent melt moldability, the content of ethylene is preferably 10–60 mol %, more preferably 20–55 mol %, and most preferably 25–55 mol %. Furthermore, the saponification degree of the vinyl ester component is 80 to 100 mol %. From the viewpoint of providing EVOH having a high gas barrier property, the saponification degree is preferably 95 mol % or more, and more preferably 99 mol % or more.

On the other hand, EVOH having an ethylene content of 3–20 mol % is used suitably for EVOH provided with water solubility. Such an aqueous solution of EVOH has an excellent gas barrier property, a film formation property, and is used for an excellent coating material.

EVOH having a saponification degree of 80–95 mol % is used suitably for improving the melting moldability. It may be possible to use such EVOH singly. It also is suitable to use such EVOH by blending with EVOH of saponification degree of 99 mol % or more.

However, from the viewpoint of the production process, it is difficult to precipitate the above-mentioned EVOH of ethylene content of 3–20 mol % and EVOH of the saponification of 80–95 mol % by extruding a methanol solution of EVOH into a coagulation bath in the form of a strand by a conventional process. Thus, it was difficult to produce pellets stably, and it was also difficult to allow acid materials and metal salts to be contained in the pellets. It was also difficult to extract residue of saponification catalyst from the pellets by diffusion. The present invention makes it possible to produce pellets stably, and to add an acid material and metal salt into the pellets. For this reason, the present invention has a great significance.

With an ethylene content of EVOH less than 3 mol %, the resulting EVOH is poor in melt moldability, and may be deteriorated in water resistance, thermal resistance, and gas barrier property under high humidity. On the other hand, with an ethylene content of EVOH more than 70 mol %, the resulting EVOH does not provide a satisfactory gas barrier property, printability, or the like. Furthermore, with the saponification degree less than 80 mol %, the resultant EVOH does not provide satisfactory gas barrier property, coloring resistance, and humidity resistance.

The following is an explanation of a process for producing EVOH. Polymerization of ethylene and vinyl ester is not limited to solution polymerization. For example, any of solution polymerization, suspension polymerization, emulsion polymerization, and bulk polymerization may be used. In addition, continuous polymerization and batch-type polymerization may be employed. Hereinafter, as an example, conditions for batch-type solution polymerization are explained.

Solvent: Alcohol is preferable. However, other organic solvents capable of solving ethylene, vinyl ester and ethylene-vinyl ester copolymer (dimethylsulfoxide, etc.) can be used. Examples of useful alcohols include methyl alcohol, ethyl alcohol, propyl alcohol, n-butylalcohol, t-butylalcohol, etc. Particularly, methyl alcohol is preferable.

Catalyst: Examples of useful catalysts include an azonitrile initiator, for example, 2,2-azobisisobutyronitrile, 2,2-azobis-(2,4-dimethylvaleronitrile), 2,2-azobis-(4-methoxy-2,4-dimethylvaleronitrile), 2,2-azobis-(2-cyclopropyl propionitrile), and the like, and an organic peroxide initiator, for example, isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide, and the like.

Vinyl ester: Vinyl acetate, fatty acid vinyl ester (vinyl propionate, pivalic acid vinyl, etc.) may be used. Furthermore, EVOH may contain 0.0002–0.02 mol % of vinylsilane compound as a copolymer component. Examples of vinylsilane compounds include, for example, vinyl trimethoxysilane, vinyl triethoxysilane, vinyltori(β-methoxy-ethoxy) silane, γ-methacryloxy propylmethoxysilane, and the like. Among them, vinyl trimethoxysilane and vinyl triethoxysilane are preferable.

(1) Temperature: 20–90° C., preferably 40–70° C.

(2) Time: 2–15 hours, preferably 3–11 hours.

(3) Polymerization rate: 10–90%, preferably 30–80% with respect to the prepared vinyl ester.

(4) Resin content in solution after polymerization: 5–85%, preferably 20–70%.

(5) Ethylene content of copolymer: 3–70 mol %, preferably 10–60 mol %, more preferably 20–55 mol %, and most preferably 25–55 mol %.

Moreover, in addition to ethylene and vinyl ester, it is possible to contain a small amount of monomer capable of being copolymerized with the ethylene and vinyl ester. Examples of such monomers include, for example, α-olefin such as propylene, isobutylene, α-octene, α-dodecene, etc.; unsaturated acid such as acrylic acid, methacrylic acid, crotonic acid, maleic acid, itaconic acid, etc., and anhydrate thereof, salt, or mono- or di-alkyl ester, etc.; nitrile such as acrylonitrile, methacrylonitrile, etc.; amide such as acrylamide, methacrylamide, etc.; olefin sulfonic acid such as ethylene sulfonic acid, allyl sulfonic acid, meta allyl sulfonic acid, etc. or salt thereof; alkyl vinyl ether, vinyl ketone, N-vinyl pyrrolidone, vinyl chloride, vinylidene chloride, etc.; and the like.

After a predetermined conversion is obtained after a predetermined time of polymerization, a polymerization inhibitor is added if necessary so as to evaporate and remove unreacted ethylene gas, and then unreacted vinyl ester is removed. The method for removing unreacted vinyl ester from ethylene-vinyl ester copolymer from which ethylene has been evaporated and removed is, for example, a method in which the copolymerization solution is supplied continuously at a constant rate from the upper part of a tower that is filled with a Raschig ring, vapor of organic solvent is blasted from the bottom part of the tower and mixed vapor of organic solvent such as methanol etc., and unreacted vinyl ester is distilled from the upper part of the tower.

An alkali catalyst is added into the copolymer solution from which unreacted vinyl ester is removed so as to saponify the vinyl ester component of the copolymer. The saponification can be performed by any of a continuous method and a batch type method. Examples of alkali catalyst include sodium hydroxide, potassium hydroxide, alkali metal alcoholate, and the like. The following are the conditions of the batch-type saponification.

(1) concentration of the copolymer solution: 10–50%

(2) reaction temperature: 30–65° C.

(3) amount of catalyst used: 0.02–1.0 equivalence (with respect to a vinyl-ester component)

(4) time: 1–6 hours

The EVOH after reaction contains alkali catalyst, by-product salts, other impurities, and the like, and it is preferable that such impurities are removed if necessary by neutralization and washing.

The present invention provides a process for producing an ethylene-vinyl alcohol copolymer resin, including feeding EVOH into an extruder, keeping the temperature of the melting resin in the extruder at 70–170° C., adjusting an amount of water by supplying/removing water into/from the extruder, and discharging the copolymer having a water content right after being discharged of 5–40 weight %. A shape of EVOH before feeding into the extruder is not particularly limited. It is possible preferably to use a pellet obtained by cutting strand precipitated in a coagulation bath, furthermore to use a crumb-like precipitate formed of coagulated EVOH paste in an indeterminate form. Furthermore, EVOH paste can be fed directly into the extruder.

The lower limit of the water content of EVOH before being fed into the extruder is preferably 0.5 weight % or more, more preferably 5 weight % or more, and particularly 7 weight % or more. Furthermore, the upper limit of the water content of EVOH before being fed into the extruder is preferably 70 weight % or less, more preferably 60 weight % or less, and particularly 50 weight % or less. If the water content of EVOH before feeding into the extruder falls within the above-mentioned range, it is possible to obtain a molten state EVOH at the temperature lower than the melting point of dry EVOH. Thus, it is possible to inhibit the thermal deterioration of EVOH in the extruder and to attain a good extruding stability.

When the water content is less than 0.5 weight %, the effect of inhibiting the thermal deterioration of EVOH in the extruder may be insufficient. On the other hand, when the water content is more than 70 weight %, the phase separation between resin and water contained in the resin is likely to occur in the resin composition of EVOH. If such a phase separation occurs, the surface of the resin becomes wet, thus increasing the friction. As a result, bridges may be formed in the hopper of the extruder, which may adversely affect the productivity of pellets of resin composition of EVOH.

The method of adjusting the water content of EVOH before being fed into the extruder is not particularly limited. In increasing the water content, a method of spraying water to resin, a method of immersing resin in water, a method of bringing resin into contact with water vapor, and the like, are employed. Furthermore, in reducing the water content, appropriate drying methods may be employed. A method of drying resin by the use of, for example, a fluid type hot-air dryer or a ventilation hot-air dryer may be employed. From the viewpoint of reducing unevenness of drying, the fluid type hot-air dryer is preferred. Furthermore, from the viewpoint of inhibiting the thermal deterioration, the drying temperature is preferably in 120° C. or less.

The temperature of the resin in the extruder is preferably 70–170° C. When the temperature of resin is less than 70° C., EVOH may not be melted completely. Furthermore, when at least one additive selected from carboxylic acid, a boron compound, a phosphoric acid compound, alkali metal salt, and alkali earth metal salt is added, the effect of improving the diffusion property may be insufficient. The resin temperature is preferably 80° C. or more, and more preferably 90° C. or more. Furthermore, when the resin temperature is more than 170° C., EVOH is susceptible to thermal deterioration. Furthermore, when at least one additive selected from carboxylic acid, a boron compound, a phosphoric acid compound, alkali metal salt, and alkali earth metal salt is added in a form of aqueous solution, if the resin temperature is more than 170° C., water evaporates radically. Consequently, it may be difficult to mix EVOH with the aqueous solution at the preferable concentration of the aqueous solution. The resin temperature is preferably 150° C. or less, more preferably 140° C. or less, and particularly 130° C. or less. The method of adjusting such resin temperatures is not particularly limited, but a method of setting the temperature inside the cylinder in the extruder at an appropriate temperature is preferable.

In the present invention, the resin temperature denotes a temperature detected by the temperature sensor provided at the cylinder of the extruder, and detected around the discharge portion at the tip of the extruder.

According to the present invention, it is possible to wash and remove the residue of the saponification catalyst contained at the time of producing the EVOH in the extruder. Specifically, the EVOH resin is fed into the extruder, a washing water is supplied from at least one portion of the extruder, the resin is washed, and the washing water is discharged from at least one place downstream from a washing water supply portion. This method is preferable because washing is performed effectively and a large washing space is not required as compared with the conventional method in which resin pellets are placed in the washing container and is brought into contact with the washing water in a solid state to extract the residue of the saponification catalyst by diffusion.

In this case, it is preferable that the residue of saponification catalyst contained in EVOH fed into the extruder is an alkali metal ion.

The content of the alkali metal ion contained in EVOH fed into the extruder is preferably 0.1–5 weight %, more preferably 0.2 weight % or more, and particularly 0.5 weight % or more, based on metal. Furthermore, the content is more preferably 4 weight % or less, and particularly 3 weight % or less. When the content is less than 0.1 weight %, EVOH can be produced sufficiently by the conventional process in a small space, and so it is less significant to employ the process of the present invention. On the other hand, when the content is more than 5 weight %, it is necessary to have an extruder of large L/D for sufficient washing, which may lead to cost increases.

Furthermore, in this case, it is preferable that the content of alkali metal ions contained in EVOH after washing is preferably 0.05 weight % or less, more preferably 0.04 weight % or less, and particularly 0.0.3 weight % or less, based on metal. The content of more than 0.05 weight % is not preferable because the thermal stability of EVOH is deteriorated.

Furthermore, the washing water used herein is not particularly limited as long as it is capable of removing the residue of the saponification catalyst, however, an aqueous solution of acid having a pKa of 3.5 or more at 25° C. is preferable. When an aqueous solution of acid having pKa at 25° C. of less than 3.5 is used, EVOH may not provide a satisfactory coloring resistance or inter layer adhesiveness. Among such acids, a carboxylic acid is preferable. In terms of cost effect, acetic acid is preferable. The concentration of the aqueous solution of acetic acid is preferably 0.01–10 g/liter, and more preferably 0.1–2 g/liter.

It is preferable that the supplied amount of washing water is 0.1–100 liter per 1 kg of feeding resin.

The method of adding washing water is not particularly limited as long as it is capable of adding washing water into an extruder. An example of an adding method includes a method of forcing the washing water by using a plunger pump, etc., and the like. A discharge portion is not particularly limited as long as it is positioned downstream from the adding portion and can discharge liquid from the extruder. A preferable example is a dewatering slit or a dewatering hole. Moreover, a plurality of adding portions or a plurality of discharge portions may be provided.

Furthermore, in the present invention, after the above-mentioned washing or without washing, it is preferable that water or water vapor is removed from a water-containing EVOH in the extruder. Specifically, it is preferable that at least one selected from water liquid or water vapor is discharged from at least one place in the extruder. The discharging method is not particularly limited. An example includes a method of discharging washing water from a dewatering slit, dewatering hole or a vent-port.

Among them, the dewatering slit or dewatering hole is preferable. Since in the case of using these means, water can be discharged in the form of liquid water or water vapor, it is possible to remove water efficiently from resin of a high water content. From this viewpoint, the dewatering slit or dewatering hole is generally more effective than the vent-port, which can discharge only water vapor. Furthermore, when water is discharged through the vent-port, resin tends to attach to the vent-port, and such attached resins are deteriorated and enter the extruder. Again, a dewatering slit or dewatering hole is preferable.

Moreover, as the vent-port, a vacuum vent for removing water vapor under reduced pressure or an open vent for removing water vapor under ambient pressure can be used.

Furthermore, when the dewatering hole is used, molten resin may leak from the hole. For this reason, the watering hole is preferred. A preferable example of such a dewatering slit includes a wedge wire dewatering slit or a screen mesh type dewatering slit. Herein, the wedge wire denotes a wire having a wedge shape, that is, a triangular prism shape cross section. In the wedge wire dewatering slit, the wedge wires are arranged with a predetermined gaps and water from the resin is extruded out through the gaps.

Moreover, the above-mentioned dewatering means may be used singly or a plurality of the same kinds of means may be used, or a combination of different kinds of means may be used. For example, it is possible to remove some amounts of water from resin of a high water content with a dewatering slit and then further removing water by the vent-port located downstream from the dewatering slit.

The water content of the pellets of resin composition of EVOH right after being discharged from the extruder is preferably 5–40 weight %. When the water content right after being discharged from the discharge portion is more than 40 weight %, the phase separation between a resin and water contained in the resin may occur in the resin composition of EVOH. As a result, strands after being discharged from the extruder may foam easily. The water content is preferably 35 weight % or less, and more preferably 30 weight % or less. Furthermore, when the water content is less than 5 weight %, the effect of inhibiting the deterioration due to heating of EVOH in the extruder may be insufficient. The resultant EVOH pellets may not be provided with a satisfactory coloring resistance. The water content is preferably 10 weight % or more, and more preferably 15 weight % or more.

At least one additive selected from carboxylic acid, a boron compound, a phosphoric acid compound, alkali metal salt, and alkali earth metal salt, can be added singly, but a plurality of the additives may be added in the preferable ranges mentioned below, in accordance with embodiment. Thereby, it is possible to improve various kinds of performances of the EVOH resin composition pellet.

It is preferable that carboxylic acid is added to the EVOH resin composition pellets of the present invention from the viewpoint of improving the thermal stability. In this case, carboxylic acid having pKa of 3.5 at 25° C. is preferable. When an aqueous solution of carboxylic acid having pKa at 25° C. of less than 3.5 is used, it is difficult to control the pH of the resin composition of EVOH. Furthermore, the resin composition of EVOH may not be provided with a satisfactory coloring resistance or interlayer adhesiveness. Examples of carboxylic acid include oxalic acid, succinic acid, benzoic acid, citric acid, acetic acid, lactic acid, and the like. In terms of cost effect, acetic acid or lactic acid is preferably used.

The content of carboxylic acid in the pellets of dried EVOH resin composition is preferably 10–5000 ppm. When the content of carboxylic acid is less than 10 ppm, coloring may occur at the time of melt molding. Furthermore, when the content of carboxylic acid is more than 5000 ppm, sufficient interlayer adhesiveness may not be obtained. The lower limit of the content of carboxylic acid is preferably 30 ppm or more, and more preferably 50 ppm or more. The upper limit of carboxylic acid is preferably 1000 ppm or less, and more preferably 500 ppm or less.

It is also preferable that a phosphoric acid compound is added to the resin composition pellets of EVOH in terms of the improvement of the thermal stability. The content of phosphoric acid compound in the pellets of dried EVOH resin composition is preferably 1–1000 ppm. By adding phosphoric acid compound within an appropriate range, it is possible to inhibit the occurrence of color development and formation of gel and hard spots. The improvement effect by the addition of phosphoric acid compound is significant at the time of the long-run formation using pellets of EVOH resin compositions and at the time of collecting products. Examples of phosphoric acid compounds include various kinds of acids such as phosphoric acid, phosphorous acid, or their salt, etc. thereof, however, the present invention is not necessarily limited to these materials. For phosphoric acid salt, any forms of primary phosphate, secondary phosphate, or tertiary phosphate may be employed. Also, the cationic species thereof are not particularly limited. However, an alkali metal salt, and an alkali earth metal salt are preferable. Above all, it is preferable that phosphoric acid compound is added in the form of sodium dihydrogen phosphate, potassium dihydrogen phosphate, disodium hydrogen phosphate, and dibasic potassium phosphate.

The lower limit of the content of phosphoric acid compound is preferably 10 ppm or more, and more preferably 30 ppm or more based on phosphate radical. The upper limit is preferably 500 ppm or less, and more preferably 300 ppm or less. By adding phosphoric acid compound in such ranges, it is possible to obtain EVOH resin composition pellets which are less colored and not likely to form gel. When the content of phosphoric acid compound is less than 1 ppm, EVOH is radically colored at the time of melt molding. In particular, the phenomenon is observed significantly when thermal treatment is performed several times. The product obtained by molding the resin composition pellets may be poor in recycling property. Furthermore, when the content of phosphorous compound is more that 1000 ppm, gel and hard spots are likely to be formed.

It is preferable that the pellets of EVOH resin composition of the A present invention contains a boron compound from the viewpoint of improving the thermal stability and mechanical property (JP-49-20675B). When a boron compound is added to an EVOH resin composition, it is thought that a chelate compound is generated between EVOH and the boron compound. By using such EVOH, it is possible to improve the thermal stability and mechanical property as compared with usual EVOH.

Examples of the boron compound include boric acid, boric acid ester, borate salt, boron hydroxide, and the like.

However, the boron compound is not necessarily limited to these materials. Specifically, examples of boric acids include orthoboric acid, metaboric acid, tetraboric acid, and the like; examples of boric acids ester include triethyl borate, trimethyl borate, and the like; examples of borate salt include alkali metal salt, alkali earth metal salt, borax, and the like, of the above-mentioned various boric acids. Among the above, orthoboric acid (referred to as merely boric acid) is preferable.

The content of boron compound in the pellets of dried resin composition of EVOH of the present invention is preferably 20–2000 ppm, and more preferably 50–1000 ppm, based on boron. When the content is less than 10 ppm, the effect of improving thermal stability by adding a boron compound may not be obtained. When the content is more than 2000 ppm, gelling easily occurs, which may lead to formation defects.

By adding alkali metal salts to the pellets of EVOH resin composition of the present invention, it is possible to improve the interlayer adhesiveness or compatibility effectively. The additive content of alkali metal salts in the pellets of dry EVOH resin composition of the present invention is 5–5000 ppm, more preferably 20–1000 ppm, and particularly 30–750 ppm, based on alkali metal atom. An example of alkali metal includes lithium, sodium, potassium, and the like. An example of the alkali metal salt includes aliphatic carboxylate, aromatic carboxylate, phosphate, metal complex of univalent metal, and the like. A specific example includes sodium acetate, sodium potassium, sodium phosphate, lithium phosphate, sodium stearate, potassium stearate, sodium of ethylenediaminetetraacetic acid, and the like. Among them, sodium acetate, sodium potassium, and sodium phosphate are preferred.

It is preferable that alkali earth metal salt is added to the pellets of the EVOH resin composition of the present invention. When alkali earth metal salt is added, the effect of improving coloring resistance is somewhat lowered. However, it is possible to further reduce the amount of the thermally deteriorated resin attached to a die of a molding machine. There is no particular limitation of alkali earth metal salt. However, magnesium salt, calcium salt, barium salt, beryllium salt, and the like, generally are used. Magnesium salt and calcium salt are particularly preferable. There is no particular limitation of anion species of alkali earth metal salt, but acetate anion, and phosphate anion are preferred.

The content of the alkali earth metal in the pellets of dry EVOH resin composition of the present invention is preferably 10–1000 ppm, and more preferably 20–500 ppm, based on alkali earth metal. When the content of alkali earth metal is less than 10 ppm, the effect of improving the long-run property may be insufficient. When the content is more than 1000 ppm, resin may be radically colored at the time of the melting resin.

When the above-mentioned at least one additive selected from carboxylic acid, a boron compound, a phosphoric acid compound, alkali metal salt, and alkali earth metal salt is allowed to be contained in the pellets of EVOH resin composition, at least one of the above-mentioned additives is added to EVOH having an ethylene content of 3–70 mol % and saponification degree of 80 mol % or more in the extruder. By adding at least one of the above-mentioned additives into the extruder, it is possible to mix at least one of the above-mentioned additives with EVOH and to knead the mixture with extremely good uniformity. With such an embodiment, it is possible to obtain pellets of EVOH resin composition in which the motor torque and torque variation in the extruder at the time of molding is small; extruding stability, coloring resistance and long-run property are excellent; less gel and hard spots occur; and resin is not attached to the die. Moreover, in the present invention, when adding at least one additive selected from carboxylic acid, a boron compound, a phosphoric acid compound, alkali metal salt, and alkali earth metal salt, the feed position of carboxylic acid in the extruder is preferably a position where the EVOH in the extruder is melted in terms of sufficiently exhibiting the effect of the present invention. In particular, it is preferable that the additive is added into a water-containing and molten state EVOH.

Moreover, it is preferable that the extruder has a kneading portion. In particular, it is preferable that is a position where additives are added is a kneading portion of the extruder for homogeneously blending the additives.

Furthermore, for the alkali metal salt and a metal salt other than alkali earth metal salt, salt of metal belonging to the fourth period of the periodic table, for example, manganese, zinc, cobalt, and the like, may be used.

There is no particular limitation of how at least one additive selected from carboxylic acid, a boron compound, a phosphoric acid compound, alkali metal salt, and alkali earth metal salt is added. For example, the materials can be added in a form of dry powder, in a form of paste in which a solvent is impregnated, in a state in which the materials are suspended in a liquid, as a solution in which the materials are dissolved in a solvent, and the like. However, from the viewpoint of controlling the adding amount, and of attaining a homogeneous diffusion of at least one of the above-mentioned additives in EVOH, the method of adding at least one of the above-mentioned additives as a solution in which the additives are dissolved in the solvent is particularly preferable. Such a solvent is not particularly limited. However, water preferably is used because water has a good solubility with respect to at least one of the above-mentioned additives, a merit in terms of cost, an easiness in handling, safety in operation environment, and the like.

There is no particular limitation in the method for adding at least one additive selected from carboxylic acid, a boron compound, a phosphoric acid compound, alkali metal salt, and alkali earth metal salt into the EVOH. However, it is preferable that at least one of the above-mentioned additives is added into the extruder from at least one or two or more place(s).

When at least one additive selected from carboxylic acid, a boron compound, a phosphoric acid compound, alkali metal salt, and alkali earth metal salt is added to EVOH in a from of a solution, the lower limit of the added amount of the solution is preferably 1 part by weight or more, more preferably 3 parts by weight or more, and particularly 5 parts by weight or more, with respect to 100 parts by weight of dry EVOH. Furthermore, the upper limit of added amount of the solution is preferably 50 parts by weight or less, more preferably 30 parts by weight or less, and particularly 20 parts by weight or less, with respect to 100 parts by weight of dry EVOH. When the added amount of the solution is less than 1 part by weight, since the concentration of the solution is generally increased, the effect of improving the diffusion property by the addition of at least one of the above-mentioned additives may be lowered. Furthermore, when the added amount is more than 50 parts by weight, it may be difficult to control the water content of EVOH, and thus phase separation between resin and water contained in the resin may occur in the resin composition of EVOH in the extruder.

In a conventional method of immersing EVOH in a solution of acidic material and/or metal salt, it was difficult to produce high quality products from the crumb-like precipitate of EVOH. According to the present invention, it is possible to add at least one additive selected from carboxylic acid, a boron compound, a phosphoric acid compound, alkali metal salt, and alkali earth metal salt into EVOH having such a shape, and thus pellets of EVOH resin composition of a stable quality can be obtained.

The method of pelletizing the resin composition of EVOH discharged from the extruder is not particularly limited. An example includes a method of extruding the resin composition from dies into a coagulation bath in the form of a strand, and cutting the strand into an appropriate length. From the viewpoint of handling pellets easily, the aperture diameter of the dies is preferably 2–5 mm φ (φ denotes a diameter and the same is true hereinafter). Preferably, the strand is cut into a length of about 1–5 mm.

In general, the resultant pellets are dried. The water content of the pellets of the resin composition of EVOH after drying is generally 1 weight % or less, and preferably 0.5 weight % or less. The drying method is not particularly limited, however, the ventilation drying method or the fluid-type drying method can be employed preferably. Also by combining some drying processes, a multi-step drying process can be employed. Among them, the method in which pellets are first dried by the fluid-type drying method, followed by drying pellets by the ventilation drying method can be used.

According to one aspect of the present invention, when the cross section of the pellets is observed by a polarization microscope (with a magnification of 600), no spherocrystals are observed in the center of the cross section. In the pellets produced by the conventional process in which strand is obtained by precipitating EVOH solution after saponification and then the strand are cut, spherocrystals are observed (Comparative Example 1). Also, in the pellets obtained by melt molding EVOH pellets without containing water at high temperature (Comparative Example 2), spherocrystals are observed. On the other hand, in the pellets of the present invention, no spherocrystals are observed, thus exhibiting a good performance.

According to another aspect of the present invention, although the resin pellet does not contain lubricant, an angle of repose is 23° or less when resin pellets are piled up. With such a low angle of repose, resins can be fed into the extruder without blocking. It is preferable that lubricant is not used from the viewpoint of sanitary aspect of the EVOH resin used for food packaging etc. The fact that the lubricant is not used signifies not only that the lubricant is not contained in the resin composition but also that the lubricant is not attached to the surface of the pellets.

In the conventional treating method in which EVOH pellets are immersed in a treating solution containing acid material and/or metal salt, the water content of EVOH after treatment was generally 40–70 weight %. However, in the method of the present invention in which EVOH is melted in the extruder and at least one additive selected from carboxylic acid, a boron compound, a phosphoric acid compound, alkali metal salt and alkali earth metal salt is added, it is possible optionally to adjust the water content of the resin composition of EVOH right after being discharged and the water content right after being discharged from the extruder is preferably 5–40 weight %. Therefore, it is possible to obtain pellets having the water content that is lower than that of the conventional pellets. The pellets having such a low water content are preferable from the viewpoint of reducing the energy consumption in the drying process.

In particular, the pellets having the water content of more than 40 weight % may be melt attached between pellets at the drying temperature of 100° C. or more. Also, from this viewpoint, the treatment method of the present invention is preferable, in which pellets having a low water content can be obtained, and at least one additive selected carboxylic acid, a boron compound, a phosphoric acid compound, alkali metal salt, alkali earth metal salt is added.

It is possible to blend EVOH having a different polymerization degree, ethylene content and saponification degree into the EVOH resin composition pellets obtained by the above-mentioned method, thus melt molding thereof. Furthermore, it is possible to add the other reinforcing materials, such as various kinds of plasticizers, stabilizers, surface active agents, colorants, UV ray absorbers, antistatic agents, drying agent, crosslinking agents, metal salts, fillers, various kinds of fibers and the like. The pellet of EVOH resin composition of the present invention has a small motor torque and torque variation and excellent extrusion stability. Thus, it is preferable that the pellets of the present invention use significantly reduced or no lubricant in some embodiments. However, when a molding is formed of the above-mentioned pellet, the use of lubricant is an option and not limited.

Furthermore, it is possible to blend an appropriate amount of thermoplastic resin other than EVOH in a scope consistent with the object of the present invention. An example of the thermoplastic resin includes various kinds of polyolefin (e.g. polyethylene, polypropylene, poly(1-butene), poly(4-methyl)-1-pentene, ethylene-propylene copolymer, copolymer ethylene and α-olefin having 4 or more carbon atoms, copolymer of polyolefin and maleic anhydride, ethylene-vinyl ester copolymer, ethylene-acrylic ester copolymer, or modified polyolefin in which the above-mentioned olefins are graft-modified with a saturated carboxylic acid or derivatives thereof, and the like), a various kinds of nylon (e.g. nylon-6, nylon-6, 6, nylon-6/6, 6-copolymer, and the like), polyvinyl chloride, polyvinylidene chloride, polyester, polystyrene, polyacrylonitrile, polyurethane, polyacetal and modified polyvinyl alcohol resin, and the like.

The resultant pellets of the EVOH resin composition of the present invention are melt-molded into various kinds of molded articles, for example, a film, a sheet, a container, a pipe, a fiber, and the like. Such molded articles are pulverized and molded again for reuse. The film, sheet, fiber etc. can be stretched by a single screw stretching method or a biaxial stretching method. An example of the usable melt molding method includes extrusion molding, inflation extrusion, blow molding, melt spinning, injection molding, and the like. The melting temperature is preferably 150–270° C., although it differs depending upon the melting point, etc. of copolymers.

The pellets of the resin composition of EVOH of the present invention are used practically in a multilayer product that includes at least one layer of the molded article such as a film, sheet, etc. of the composition of the present invention, as well as in a molded article that includes a single layer of the present resin composition. An example of the laminated structure product includes E/Ad/T, T/Ad/E/Ad/T, and the like, wherein E denotes a an EVOH resin composition of the present invention, Ad denotes an adhesive resin, and T denotes a thermoplastic resin. However, the present invention is not limited to this structure alone. The respective layer may be a single layer and occasionally may be a multilayer.

An example of usful thermoplastic resin includes linear low density polyethylene, low density polyethylene, medium density polyethylene, high density polyethylene, an ethylene-vinyl acetate copolymer, an ethylene-propylene copolymer, polypropylene, propylene-α-olefin copolymer (α-olefin has 4 to 20 carbon atoms), olefin such as polybutene, polypentene, etc., or copolymer thereof, polyester such as polyethylene terephthalate, etc., polyester elastomer, polyamide resin such as nylon-6, nylon-6, 6, etc., polystyrene, polyvinyl chloride, polyvinylidene chloride, acrylic resin, vinyl ester resin, polyurethane elastomer, polycarbonate, chlorinated polyethylene, chlorinated polypropylene, and the like. Among them, polypropylene, polyethylene, ethylene-propylene copolymer, ethylene-vinyl acetate copolymer, polyamide, polystyrene, polyester are preferably used.

When laminating EVOH and thermoplastic resin, adhesive resin may be used. In this case, adhesive resin made of carboxylic acid modified polyolefin is preferable. As carboxylic acid modified polyolefin, modified polyolefin copolymer containing carboxylic group, which is obtained by chemically bonding ethylene unsaturated carboxylic acid or anhydride thereof to olefin-based polymer (chemically bonding herein includes, bonding by, for example, addition reaction, or grafting reaction). Olefin-based polymer herein denotes polyolefin such as polyethylene (low pressure, medium pressure, high pressure), linear low density polyethylene, polypropylene, polybutene, and the like, and copolymer of olefin and a co-monomer (for example, with vinylester, unsaturated carboxylic ester, etc.) capable of copolymerizing olefin. For example, the copolymer is ethylene-vinyl acetate copolymer, copolymer of ethylene and ethyl ester acrylate, and the like. Among them, linear low density polyethylene, ethylene-vinyl acetate copolymer (the content of vinyl acetate is 5–55 weight %), and a copolymer of ethylene and ethyl ester acrylate (the content of ethyl ester acrylate is 8–35 weight %) are preferable. Linear low density polyethylene and ethylene-vinyl acetate copolymer are particularly preferable. An example of ethylene unsaturated carboxylic acid or anhydride thereof includes ethylene unsaturated mono-carboxylic acid and ester thereof, ethylene unsaturated dicarboxylic acid or mono- or di-ester thereof and anhydride thereof. Among them, ethylene unsaturated dicarboxylic acid anhydride is preferable. A specific example includes maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Particularly, maleic anhydride is preferable.

The amount of ethylene unsaturated carboxylic acid or anhydride thereof to be added or grafted (modification degree) is 0.01 to 15 weight % and preferably 0.02 to 10 weight % with respect to olefin-based polymer. The addition reaction or grafting reaction of ethylene unsaturated carboxylic acid to the olefin-based polymer can be obtained by a radical polymerization method in the presence of, for example, solvent (xylene, etc.), catalyst (peroxide, etc.) or the like. The melt index (MI) of the resultant carboxylic acid modified polyolefin is preferably 0.2–30 g/10 min, and more preferably 0.5–10 g/10 min when measured by D-1238-65T in accordance with ASTM-D1238 at 190° C. These adhesive resins may be used singly or in combination of two layers or more.

In the present invention, the above-mentioned multilayer product can be used in various kinds of shapes. However, in order to improve the physical property of the multilayer product, stretching is also preferable. Thereby, it is possible to obtain a stretched film, a stretched sheet, and the like, which is free from rupture, pin-hole, stretching inconsistency, and delamination.

For stretching, any of a uniaxial stretching method and a biaxial stretching method may be employed. From the viewpoint of obtaining good physical properties, stretching in the highest possible stretching ratio is preferred. In the present invention, it is possible to obtain a stretched film, a stretched sheet, and the like, which is free from pin-hole, crack, stretching inconsistency, and delamination at the time of stretching.

An example of useful stretching method includes a stretching method of higher draw ratio from a deep-drawing formation, a vacuum formation, etc., in addition to a roll stretching method, a tenter stretching method, a tubular stretching method, a stretching blow method, and the like. As the biaxial stretching, any of a simultaneous biaxial stretching method and a sequential stretching method may be employed. The stretching temperature is selected from 80–170° C., and preferably from 100–160° C.

Thus, the stretching is completed, followed by thermal fixation. The thermal fixation can be carried out by well-known means. The thermal fixation is carried out at 80–170° C. and preferably 100–160° C. for 2–600 seconds with the stretched film tensioned. Furthermore, the resultant stretched film may be subjected to a cooling treatment, a printing treatment, a dry laminating treatment, a solution coating or melt coating treatment, a bag-making process, a box process, a tube process, split process, and the like.

The shape of the thus obtained multilayer product is optionally selected. Examples of the shape include film, sheet, tape, bottle, pipe, filament, profile extruded product, and the like. Furthermore, the resultant multilayer product can be subjected to a thermal treatment, a cooling treatment, a rolling treatment, a printing treatment, a dry laminating treatment, a solution coating or a melting coat treatment, a bag-making treatment, a deep-drawing treatment, a box treatment, a tube treatment, a split treatment, and the like. The thus obtained film, sheet, container, or the like, are useful for packaging materials of various kinds of products such as foods, drugs, industrial chemicals, agricultural chemicals, or the like.

When the multilayer products are produced, another base material is laminated on one or both surface(s) of the layer made of molded articles such as a film, a sheet, etc, which is obtained from the EVOH resin composition of the present invention. An example of a laminating method includes: a method of melt extruding a thermoplastic resin onto the molded articles (film, sheet, etc.); a method of co-extruding resin composition and other thermoplastic resin onto the base material of thermoplastic resin, etc.; a method of co-injecting the thermoplastic resin and EVOH resin composition; furthermore, a method of laminating a molded articles obtained from the EVOH resin composition onto a film or a sheet made of resin composition of other base material with a known adhesive such as an organic titanium compound, an isocyanate compound, a polyester-based compound, etc.; and the like. Among them, the method of co-extruding the resin composition and other thermoplastic resin is preferable. Since the EVOH resin composition of the present invention is excellent in the interlayer adhesiveness, it is preferable as a resin composition for co-extrusion and a co-extrusion multilayer product used thereof.

As the method of co-extruding the composition of the present invention and thermoplastic resin, any of a multi-manifold combining system T die method, a feed-block combining system T die method, and an inflation method may be employed.

By secondary processing the thus obtained co-extrusion multilayer product, various kinds of molded articles (film, sheet, tube, bottle, etc.) can be obtained. The following is an example of the obtainable molded articles.

(1) A multilayer co-stretched sheet or film produced by uniaxially or biaxially stretching or biaxially stretching a multilayer product (sheet, film, or the like), and then thermally treating thereof.

(2) A multilayer roll sheet or film produced by rolling a multilayer product (sheet, film, or the like).

(3) A multilayer package such as a tray, cup, etc., produced by a thermal molding process such as a vacuum molding, a pressure molding, vacuum pressure molding, and the like, a multilayer product (sheet, film, or the like).

(4) A package such as a bottle, cup, etc., produced by stretch blow molding from a multilayer product (pipe, etc.).

There is no particular limitation to the secondary processing method. A well-known secondary processing method other than the methods mentioned above (for example, blow molding) can be employed.

Since in the thus obtained co-extrusion multilayer products and co-injection multilayer products, less gel and hard spots are formed, and fish eye and streaks occur less at the time of forming films, such products can be used for materials for food packages, for example, a deep drawing container, cup, bottle, and the like.

EXAMPLE

Hereinafter, the present invention will be explained with reference to Examples and Comparative Examples but is not limited to them alone. Hereinafter, "%" and "part" are expressed based on weight unless otherwise noted. Moreover, water herein denotes ion exchange water.

(1) Measurement of Water Content

A sample of water-containing EVOH (20 g) was placed in a well-dried weighing bottle. The sample was dried with a hot-air dryer at 120° C. for 24 hours. The water content of EVOH was calculated from the change in values of weight of EVOH before and after drying. The calculation was performed in accordance with the following equation (1).

Water content (weight %)=(weight before drying−weight after dried)/weight before drying×100    Equation (1)

(2) Measurement of Number of Spherocrystals

The pellets of EVOH resin composition were cut with "Leichelt Ultra-cut S" manufactured by Leica so as to obtain a slice having a thickness of 1 μm. A sealing liquid (refractive index: 1.53) was added to the resultant sample slice, which was observed by a polarization microscope (OPTIPHOT-POL manufactured by NIKON CORP.) with a magnification of 600. The center of the pellet (inner part from 0.1 mm or more from the surface) was examined for spherocrystals.

(3) Measurement of Angle of Repose

Figure 2:
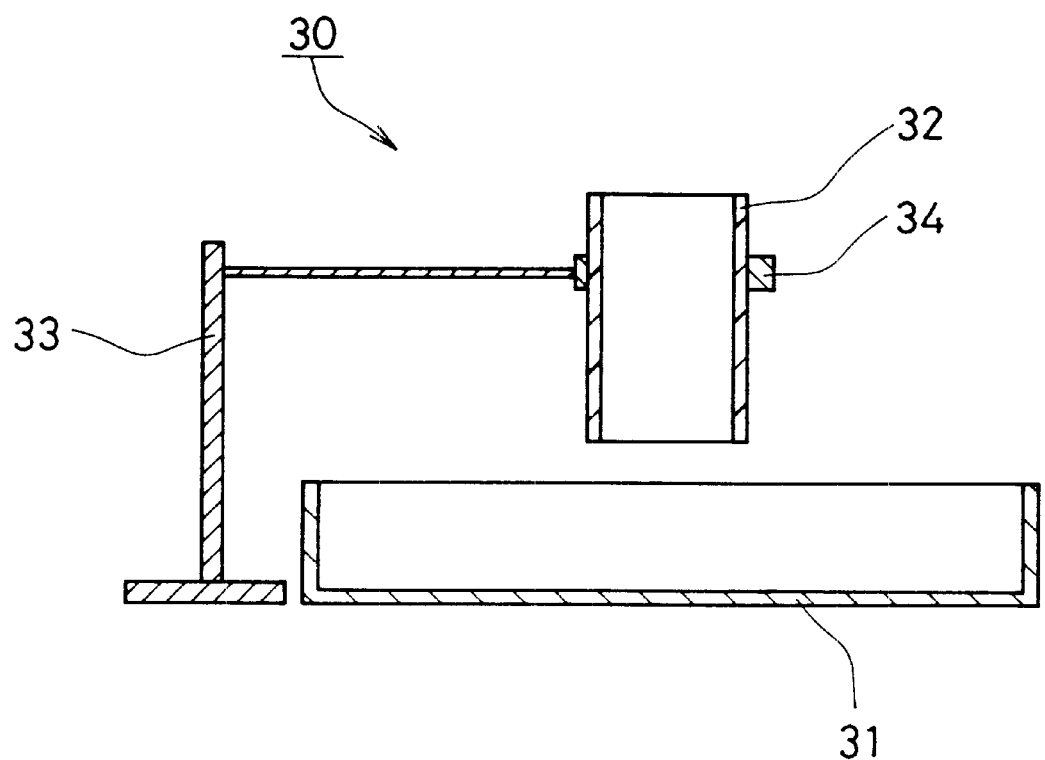
FIG. 2 is a cross-sectional view showing a method for measuring an angle of repose of the resin pellet obtained in Examples 1 to 4 according to the present invention.

An angle of repose was measured by using a measuring device 30 shown in FIG. 2. The measuring device 30 includes a stainless steel butt 31 (size: 470 mm×330 mm×80 mm, buff polishing finish (#400 finish)), a hollow cylindrical sample receiver 32 (polyvinyl chloride pipe), a sample receiver holder 33 holding the hollow cylindrical sample receiver 32, and a supporting ring 34. The hollow cylindrical sample receiver 32 is 42 mm in outer diameter, 35 mm in inner diameter, and 365 mm in height. First, the butt 31 was set on a horizontal plane and the sample receiver 32 is positioned at the center of the butt 31. The water content of the pellet sample was set to be 0.3 weight % or less. The measuring environment was kept at the temperature of 20±2° C., and the relative humidity of 65% RH. The pellet sample was collected with a sample container (300 ml), and whole sample is gently added into the sample receiver 32. After the sample is added, the sample receiver is lifted up gently until the shape of the samples becomes like a mountain. Next, a diameter of the bottom part of the mountain-shaped sample was read. In reading, diameters of four directions are read in accordance with the scales marked on lines radially drawn in eight directions on the butt 31. At this time, the diameter was determined based on the circumference of the bottom part of the sample with sample. At this time, samples independently scattered were disregarded. The height of the cone of samples (the length between the top part and the bottom part of the mountain-shaped samples) was measured. The height was determined by crossing the C-type 1st stainless steel scale over the upper part of the butt 31, measuring the length between the side of the surface of the scale and the top of the cone of the sample, and subtracting the above-measured length from the depth of the butt (80 mm). The thus obtained value was made to be the height of the sample cone. Measurement was performed five times and the average was taken. The angle of repose was calculated with the following equation and the calculated value was expressed by integer of the first digit in accordance with JIS Z 8401 and JIS R 9301.

$$\theta=\arctan(2h/D)$$

wherein θ denotes an angle of repose (°), h denotes the height of the cone of sample (mm), and D denotes the average value of the diameter of four directions (mm).

(4) Determination of Added Minor Component

Determination was performed in accordance with the following method. "Dry pellets" herein denote pellets obtained as follows. The EVOH resin composition pellets to which at least one selected from carboxylic acid, a boron compound, a phosphoric acid compound, alkali metal salt, and alkali earth metal salt was added were dried at 100° C. for 15 hours with a fluid-type hot-air dryer and then dried at 100° C. for 15 hours with a ventilation hot-air dryer.

(4-a) Determination of Carboxylic Acid Content

A sample of dry pellets (20 g) was placed in 100 ml of ion exchange water and heated at 95° C. for 6 hours to obtain an extract solution. The content of carboxylic acid was determined by neutralization titration of the extract solution with 1/50N NaOH. Phenolphtalein was used as an indicator.

(4-b) Determination of Alkali Metal and Alkali Earth Metal Ion

A sample dry pellets (10 g) was placed in 50 ml of 0.01N aqueous solution of hydrochloric acid, and stirred at 95° C. for 6 hours. The stirred aqueous solution was subjected to a quantitative analysis with ion chromatography. For a column, ICS-C25 manufactured by YOKOGAWA ELECTRIC CORP. was used. For an eluent, an aqueous solution of 5.0 mM tartaric acid and 1.0 mM 2,6-pyridinedicarboxylic acid was used. In determination, a calibration curve made with respect to each metal chloride aqueous solution was used. Thus, the amount of alkali metal salts and the amount of alkali earth metal salts in the dry pellets were obtained based on metal by using the resultant amount of ions.

(4-c) Determination of Boron Compound $Na_2CO_3$ aqueous solution was added to the sample pellets and subjected to an incineration in a platinum crucible at 600° C. Hydrochloric acid was added to dissolve the obtained sample. Then, the content of boron compound in the obtained sample was determined based on boric acid by an ICP emission spectral analysis.

(4-d) Determination of Phosphoric Acid Ion

A sample of dry pellets (10 g) was placed in 50 ml of 0.01N aqueous solution of hydrochloric acid and stirred at 95° C. for 6 hours. The stirred aqueous solution was subjected to a quantitative analysis with ion chromatography. For a column, ICS-A23 manufactured by YOKOGAWA ELECTRIC CORP. was used. For an eluent, an aqueous solution containing 2.5 mM sodium carbonate and 1.0 mM sodium carbonate was employed. In the determination, a calibration curve made with respect to a solution of phosphoric acid was used. Thus, the amount of phosphorous compound was obtained based on phosphoric acid radical from the amount of the resultant ion.

(5) Melt Index (MI)

The melt index was measured in accordance with ASTM-D1238 by using a melt indexer under the conditions where the temperature was 190° C. and load was 2160 grams.

(6) Single-layer Film Formation Test (6-a) Motor Torque and Torque Variation at the Time of Feeding Into Extruder A single-layer film of EVOH resin composition was formed by using an extruder having the following specifications and the motor torque and torque variation of the EVOH resin composition pellets when they are added into the extruder.

The following are the specifications of the extruder.

| Extruder | GT-40-A manufactured by PLASTIC TECHNOLOGY CO., LTD. |
|---|---|
| Type | single screw extruder (non-vent type) |
| L/D | 26 |
| CR | 3.5 |
| Diameter | 40 mm φ |
| Screw | Single-start full-flight type |
| Rotation number | 40 rpm |
| Driving machine | DC electric motor SCR-DC218B manufactured by SUMITOMO HEAVY INDUSTRIES, LTD. |
| Motor capacity | DC 7.5 W (rated 45A) |
| Heater | Four-part split type |
| Width of die | 300 mm |
| Temperature of resin in die | 240° C. |
| Speed of taking out resin | 10 m/min |

(6-b) Gels and Hard Spots

A single layer film of EVOH was formed by using a sample of dry pellets. One hour after the film formation started, the number of gels and hare spots (each of which is about 100 μm or larger, and can be visually observed) was counted, and then the converted into a number with respect to 1.0 m². The resultant films were evaluated as follows in accordance with the number of hard spots.

A: less than 20

B: 20 to 40

C: 40 to 60

D: 60 or more (6-c) Coloring Resistance

A single layer film of EVOH was formed by using a sample of dry pellets. One hour after the film formation started, films were rolled onto a paper tube and the coloring degree on the end face of the film was examined visually. Then, evaluation was performed as follows.

A: no coloring

B: somewhat yellowing

C: yellowing

D: radically coloring (6-d) Amount of Resin Attached to the Inside Die

A single layer film of EVOH was formed by using a sample of pellets for 8 hours. After the film formation started, the EVOH resin inside the extruder was replaced by LDPE of MI=1. Then, the amount of EVOH resin thermally deteriorated and attached to the inside of die was measured.

(7) Rate of Melt Attachment of Pellets

Five hundred grams of pellets of EVOH resin composition after being discharged from the extruder were allowed to pass through a 5-mesh metal screen gently, and then the weight of the melt attached pellets on the metal screen was measured. The occurrence of melt attachment of pellets was determined from the resultant weight value by the following equation (Equation 2) and shown in weight %.

Occurrence of melt attachment (%)=weight of melt attached pellets (g)×100/500 (g)  (Equation 2)

(8) Surface Water Content

EVOH pellets (10 kg) were centrifuged with a centrifugal separator. The centrifugal separator was an upper part removing type centrifugal separator H-130M manufactured by Kokusan Enshinki K.K. and has the below-mentioned specifications. The surface water content of EVOH pellets was calculated from the change in weight between before centrifuging and after centrifuging by the following equation (Equation 3).

(Specifications of Centrifugal Separator)

Type: H-130 M

Name: upper-part removing type centrifugal separator

Capacitor: 107L (diameter 914 mm×depth 430 mm)

Material: SUS 304

Rotation number: 1000 rpm (510 G)

<Surface water content>

Surface water content (weight %)=[(weight before centrifuge−weight after centrifuge)/weight before centrifuge]×100  (Equation 3)

(9) Raw Material Feeding Continuous Test

The raw material feeding continuous test was carried out using a volumetric feeder of the following specifications shown in FIG. 11. The continuous test was carried out for 8 hours and the time from the time in which the test was started to the time in which extrusion defect occurred was taken.

<Volumetric Single Screw Feeder>

Specification: SVF-25 manufactured by Nippon Seikosho K.K.

Treating amount: 10 kg/hr (capability: 4–20 kg/hr)

Hopper: 30L

Drive: 0.4 KW

Example 1

EVOH having an ethylene content of 32 mol %, a saponification degree of 99.5 mol % and a water content of 35 weight % was fed into the twin-screw extruder shown in FIG. 1. The temperature of resin at the discharge portion was set to be 100° C. A treating solution made of an aqueous solution of acetic acid/boric acid/sodium acetate/magnesium acetate/potassium dihydrogen phosphate was added from the minor component feeding portion located at the tip of the discharge portion side shown in FIG. 1. The feeding amount of EVOH per unit time was 10 kg/hr (which includes the weight of water contained), and the added amount of treating solution per unit time was 0.65 L/hr. The treating solution has a composition including 4.3 g/L of acetic acid, 15 g/L of boric acid, 4.6 g/L of sodium acetate, 3.0 g/L of magnesium acetate, and 1.4 g/L of potassium dihydrogen phosphate. The following is the specifications of the twin-screw extruder (FIG. 1 shows a detailed structure).

| Type | Twin-screw extruder |
|---|---|
| L/D | 45.5 |
| Diameter | 30 mm φ |
| Screw | Complete meshing in the same direction |
| Rotation number | 300 rpm |
| Motor capacity | DC 22 KW |
| Heater | 13-parts split type |
| Number of dies holes | 5 holes (hole diameter: 3 mm φ) |
| Temperature of resin in dies | 105° C. |
| Speed of taking out resin | 5 m/min |

The water content of the EVOH resin composition pellets after being discharged from the extruder was 20 weight %. When the obtained pellets were dried at 100° C. for 15 hours with a fluid type dryer and then dried at 100° C. for 15 hours with a ventilation dryer, the water content was 0.3 weight %. The dried pellet of resin composition of EVOH had the content of acetic acid of 300 ppm, the content of boron compound of 270 ppm based on boric acid, and the content of phosphoric acid compound of 100 ppm based on phosphate radical. The content of alkali metal salts was: 40 ppm for potassium based on metal and 130 ppm for sodium based on metal. The content of alkali earth metal salts was 50 ppm for magnesium based on metal. Furthermore, MI was 1.5 g/10 min.

When the resultant dry pellets were examined for spherocrystals inside the pellet, no spherocrystals were observed. Furthermore, the angle of repose was 22°.

A single layer film was formed of the dry pellets. The motor torque and torque variation at the time of extrusion, the occurrence of gel and hard spots, coloring resistance and the amount of pellets attached to the die, were tested.

The following are the specifications of the twin-screw extruder and T die used in the tests.

| Extruder | GT-40-A manufactured by PLASTIC TECHNOLOGY CO., LTD. |
|---|---|
| Type | Single-screw extruder (non-vent type) |
| L/D | 26 |
| CR | 3.5 |
| Diameter | 40 mm φ |
| Screw | Single-start full-flight type, nitrided steel surface |
| Rotation number | 40 rpm |
| Driving machine | DC electric motor SCR-DC218B Manufactured by SUMITOMO HEAVY INDUSTRIES, LTD |
| Motor capacity | DC 7.5 KW (rated 45A) |

-continued

| Heater | 4-parts split type |
|---|---|
| Width of die | 300 mm |
| Temperature of resin in dies | 240° C. |
| Speed of taking out resin | 10 m/min |

After a single-layer film was formed under the above-mentioned conditions, the motor torque was 220 kg·cm, and the torque variation was 50 kg·cm at the time of extrusion. The test for gel and hard spots and color resistance test were evaluated as "A" and the amount of the resin attached to the inside of the die was 2.2 grams.

Examples 2 to 4

EVOH pellets were produced by the same manner as in Example 1 except that an ethylene content, the saponification degree, resin temperature inside the extruder, the water content of the resin before feeding into the extruder and the water content right after being discharged were changed as shown in Table 1 and the feeding amount of EVOH per unit time, the feeding amount and the composition of the solution of at least one additive selected from carboxylic acid, a boron compound, a phosphoric acid compound, alkali metal salt, and alkali earth metal salt are changed as shown in Table 2. Table 1 shows the conditions of extrusion, Table 2 shows the composition of the treating solution, Table 3 shows the composition of the obtained EVOH pellet and Table 4 shows evaluation results.

Comparative Example 1

A 45% methanol solution of ethylene-vinyl acetate copolymer having an ethylene content of 32 weight % was placed in a saponification reactor, a sodium hydroxide/methanol solution (80 g/L) was added thereto so as to be 0.4 equivalent with respect to a vinyl acetate component in the copolymer, and methanol was added thereto so that the concentration of the copolymer was adjusted to 20%. The temperature was raised to 60° C. and reaction was performed for about 4 hours while blowing nitrogen gas into the reactor. After 4 hours, the reacted product was neutralized with acetic acid to stop the reaction. Furthermore, water was supplied thereto, and a water and methanol solution of EVOH having an ethylene content of 32 weight % and saponification degree of 99.5% was obtained. The EVOH solution was extruded from a metal mold having circular holes into water, thereby allowing the EVOH solution to precipitate in the form of a strand. The strand was cut into pellets having a diameter of about 3 mm and a length of about 5 mm. The obtained pellets were dewatered with a centrifugal separator. Furthermore, the operation in which a large amount water was added to the dewatered pellets and again dewatered with a centrifugal separator was repeated.

3.5 kg of the thus obtained EVOH pellets (water content: 55 weight %) were immersed in 6 L aqueous solution containing 0.4 g/L of acetic acid, 0.4 g/L of sodium acetate, 0.3 g/L of magnesium acetate, 0.1 g/L of potassium dihydrogen phosphate, and 0.7 g/L of boric acid at 25° C. for 6 hours. After immersing, liquid was removed from the pellet, and the obtained pellet of resin composition of EVOH (water content: 55 weight %) was dried at 80° C. for 15 hours with a fluid type dryer and then dried at 100° C. for 24 hours by using a ventilation dryer. Thus, dry pellets (water content: 0.3 weight %) were obtained.

The dried pellet of resin composition of EVOH had the content of acetic acid of 300 ppm, the content of boron compound of 270 ppm based on boric acid, and the content of phosphoric acid compound of 100 ppm based on phosphoric acid radical. The content of alkali metal salts was: 40 ppm for potassium based on metal and 130 ppm for sodium based on metal. The content of alkali earth metal salts was 50 ppm for magnesium based on metal. Furthermore, MI was 1.5 g/10 min. Evaluations for the obtained pellets were made by the same manner as in Example 1. Table 4 shows the evaluation results.

Comparative Example 2

EVOH resin composition pellets were produced with the dried EVOH resin composition obtained in Comparative Example 1 by using an extruder of the following specifications.

The following are the specifications of the extruder.

| Extruder | GT-40-A manufactured by PLASTIC TECHNOLOGY CO., LTD. |
| --- | --- |
| Type | Single-screw extruder (non-vent type) |
| L/D | 26 |
| CR | 3.5 |
| Diameter | 40 mm φ |
| Screw | Single-start full-flight type, nitriding steel surface |
| Rotation number | 40 rpm |
| Driving machine | DC electric motor SCR-DC218B Manufactured by SUMITOMO HEAVY INDUSTRIES LTD. |
| Motor capacity | DC 7.5 KW (rated 45A) |
| Heater | 4-parts split type |
| Die width | 6 holes (hole diameter: 3 mm φ) |
| Temperature of resin in dies | 250° C. |
| Speed of taking out resin | 2 m/min |

The resultant pellets of EVOH resin composition were dried at 100° C. for 24 hours with a ventilation dryer to obtain dry pellets (water content: 0.3 weight %). The dried pellets of resin composition of EVOH had the content of acetic acid of 220 ppm, the content of boron compound of 270 ppm based on boric acid, and the content of phosphoric acid compound of 100 ppm based on phosphoric acid radical. The content of alkali metal salts was: 40 ppm for potassium based on metal and 130 ppm for sodium based on metal. The content of alkali earth metal salts was 50 ppm for magnesium based on metal. Furthermore, MI was 1.5 g/10 min. The pellets were examined in the same manner as in Example 1.

The conditions and results mentioned above are shown in Tables 1 to 4.

TABLE 1

[Conditions of extrusion]

| | Ethylene content (mol %) | Saponification degree (%) | Feeding amount of EVOH *1 (kg/hr) | Adding amount of treating solution (L/hr) | Temperature of resin in extruder (° C.) | Water content Before feeding into extruder (wt %) | Water content Right after discharged from extruder (wt %) |
| --- | --- | --- | --- | --- | --- | --- | --- |
| Ex. 1 | 32 | 99.5 | 10 | 0.65 | 100 | 35 | 20 |
| Ex. 2 | 32 | 99.5 | 10 | 0.5 | 120 | 50 | 30 |
| Ex. 3 | 55 | 90 | 10 | 0.45 | 100 | 10 | 10 |
| Ex. 4 | 5 | 99 | 10 | 0.7 | 100 | 30 | 20 |
| Co. 2 | 32 | 99.5 | 10 | — | 250 | 0.3 | 0.3 |

*1 weight of EVOH in a water-containing state
Ex: Example, Co: Comparative Example (the same is true in the following Tables)

TABLE 2

[Composition of treating solution]

| | Acetic acid (g/L) | Boric acid (g/L) | Phosphoric acid compound (g/L) | Alkali metal salt (g/L) | Alkali earth metal Salt (g/L) |
| --- | --- | --- | --- | --- | --- |
| Ex.1 | 4.3 | 15 | $NH_2PO_4$ 1.4 | NaOAc 4.6 | $Mg(OAc)_2$ 3.0 |
| Ex.2 | 7.2 | — | $H_3PO_4$ 1.6 | NaOAc 17.8 | $Ca(OAc)_2$ 4.0 |
| Ex.3 | — | — | $H_3PO_4$ 2.1 | $NaH_2PO_4$ 10.4 | — |
| Ex.4 | 2.1 | — | $H_3PO_4$ 0.3 | NaOAc 4.6 | $Ca(OAc)_2$ 4.0 |
| Co.1 | 0.4 | 0.7 | $KH_2PO_4$ 0.1 | NaOAc 0.4 | $Mg(OAc)_2$ 0.3 |

TABLE 3

[Composition of resin composition pellet]

| | Acetic acid (ppm) | Boric acid*1 (ppm) | Phosphoric acid Compound*2 (ppm) | Alkali metal salt*3 (ppm) | Alkali earth metal Salt*4 (ppm) |
| --- | --- | --- | --- | --- | --- |
| Ex.1 | 300 | 270 | 100 | K 40 / Na 130 | Mg 50 |
| Ex.2 | 500 | — | 150 | Na 500 | Ca 100 |
| Ex.3 | — | — | 500 | Na 100 | — |
| Ex.4 | 150 | — | 30 | Na 130 | Ca 100 |
| Co.1 | 300 | 270 | 100 | K 40 / Na 130 | Mg 50 |
| Co.2 | 220 | 270 | 100 | K 40 / Na 130 | Mg 50 |

*1: based on boric acid
*2: based on phosphoric acid radical
*3: based on metal
*4: based on metal

TABLE 4

[Evaluation results]

| | Quality of pellet | | Extruding stability | | | Quality of film | |
|---|---|---|---|---|---|---|---|
| | Number of sphero-crystals (number/mm²) | Angle of repose (°) | Torque at the time of feeding into extruder (kg · cm) | Torque variation (kg · cm) | Attached amount in die (g) | Gel and hard spots | Coloring resistance |
| Ex. 1 | Not observed | 22 | 220 | 50 | 2.2 | A | A |
| Ex. 2 | Not observed | 21 | 170 | 20 | 1.4 | A | B |
| Ex. 3 | Not observed | 22 | 185 | 25 | 2.9 | B | B |
| Ex. 4 | Not observed | 21 | 180 | 30 | 1.3 | B | B |
| Co. 1 | Observed | 25 | >1000 | >300 | 3.1 | B | B |
| Co. 2 | Observed | 26 | >1000 | >300 | 3.5 | B | C |

As is apparent from Tables 1 to 4 (particularly from Table 4), in Examples 1 to 4 of the present invention, spherocrystals were not observed, and the angle of repose was within the range of 21° to 22°. Therefore, the pellets produced in Examples 1 to 4 can be fed into the extruder smoothly, and extruding stability and quality of formed films are excellent. On the other hand, the pellets obtained in Comparative Examples 1 and 2 cannot be fed into the extruder smoothly and extruding stability of the pellets was not preferable, because, in Comparative Example 1, acetic acid etc. is adsorbed due to the immersing method, and in Comparative Example 2, the pellets were produced by extrusion molding of the resin obtained in the Comparative Example 1, and so spherocrystals were observed and the angle of repose was more than 23°.

As mentioned above, according to Examples 1 to 4, by wet-extruding EVOH by using an extruder, it is possible to produce EVOH resin pellets, which reduce a discharge load to the environment, can be fed into an extruder smoothly without being blocked, and are excellent in extruding stability and thermal stability (long-run property). Furthermore, since the treatment can be performed at relatively low temperature, it is possible to produce EVOH resin pellets in which the polymer is prevented from being deteriorated.

Example 5

EVOH having an ethylene content of 32 mol %, the saponification degree of 99.5 mol % and the water content of 35 weight % and a sodium content of 1.5 weight % based on metal was fed into a twin-screw extruder shown in FIG. 3. The twin-screw extruder includes a raw material feeding portion, a washing water supply portion, and a dewatering portion. The dewatering portion was provided with a wedge wire type dewatering slit. 0.5 g/L of acetic acid aqueous solution was added from the washing water supply portion. The feeding amount of EVOH per unit time was 50 kg/hr (which includes the weight of water contained), and the added amount of aqueous solution of acetic acid per unit time was 600 L/hr. The retention time of EVOH was 5 minutes. Thereafter, EVOH discharged from a strand die installed at the tip of the extruder was cut in the form of a strand with a pelletizer, to thus obtain pellets. The following are the specifications of the twin-screw extruder.

| Type | Twin-screw extruder |
|---|---|
| L/D | 42 |
| Diameter | 47 mm φ |
| Screw | Complete meshing in the same direction |
| Rotation number | 450 rpm |
| Temperature of cylinder | 95° C. |
| Temperature of dies | 120° C. |
| Number of dies hole | 5 holes |

The water content of the EVOH resin composition pellets after being discharged from the extruder was 39 weight %. The content of sodium ions in the resin was 0.0007 weight % based on metal.

Examples 6 to 9

EVOH pellets were produced by the same manner as in Example 5 except that an ethylene content of EVOH, the saponification degree and extruding conditions such as the feeding amount of EVOH, the concentration and the adding amount of acetic acid in the washing water were changed to those shown in Table 5. Table 6 shows evaluation results in terms of a washing property.

Comparative Example 3

0.7 kg of water-containing EVOH pellets having an ethylene content of 32 mol %, the saponification degree of 99.5 mol %, the water content of 40 weight % and the content of sodium ions of 1.5 weight % based on metal were immersed in 25 L of 0.5 g/L aqueous solution of acetic acid (30° C.), and washed for 5 minutes, which corresponds to the retention time of the EVOH in the extruder. Thereby, the washed water-containing EVOH pellets (water content: 40 weight %) were obtained. The obtained pellets were evaluated in the same manner as in Example 5. Table 6 shows the evaluation results.

Comparative Example 4

0.7 kg of water-containing EVOH pellets having an ethylene content of 55 mol %, the saponification degree of 90.0 mol %, the water content of 43 weight % and the content of sodium ions is 1.0 weight % based on metal were immersed in 25 L of 0.5 g/L aqueous solution of acetic acid (30° C.) and washed for 5 minutes, which corresponds to the retention time of the EVOH in the extruder. Thereby, the washed water-containing EVOH pellets (water content: 43 weight %) were obtained. The obtained pellets were evaluated in the same manner as in Example 5. Table 6 shows the evaluation results.

Comparative Example 5

0.7 kg of water-containing EVOH pellets having an ethylene content of 10 mol %, the saponification degree of 99.0 mol %, the water content of 45 weight %, and the content of sodium ions of 2.0 weight % based on metal were immersed in 25 L of 0.5 g/L aqueous solution of acetic acid (30° C.) and washed for 5 minutes, which corresponds to the retention time of the EVOH in the extruder. Thereby, the washed water-containing EVOH pellets (water content: 45 weight %) were obtained. The pellets were evaluated by the same manner as in Example 5. Table 6 shows the evaluation results.

TABLE 5

|  | Ethylene content (mol %) | Saponification degree (%) | Feeding amount of EVOH *1(kg/hr) | Concentration of acetic acid in washing liquid (g/L) | Adding amount of washing water (L/Hr) |
| --- | --- | --- | --- | --- | --- |
| Ex.5 | 32 | 99.5 | 50 | 0.5 | 600 |
| Ex.6 | 32 | 99.5 | 50 | 0.5 | 300 |
| Ex.7 | 32 | 99.5 | 50 | 0 | 600 |
| Ex.8 | 55 | 90 | 50 | 0.5 | 600 |
| Ex.9 | 10 | 99 | 50 | 0.5 | 600 |

*1: weight of EVOH in a water-containing state

TABLE 6

| | Water content (wt %)*2 | | Content of alkali metal ion (wt %) | |
| --- | --- | --- | --- | --- |
| | Before extruding into extruder | Right after extruded from extruder | Before washing | After washed |
| Ex.5 | 40 | 39 | 1.5 | 0.0007 |
| Ex.6 | 40 | 37 | 1.5 | 0.0033 |
| Ex.7 | 40 | 39 | 1.5 | 0.0132 |
| Ex.8 | 43 | 43 | 1.0 | 0.0009 |
| Ex.9 | 45 | 46 | 2.0 | 0.0041 |
| Co.3 | 40 | 40 | 1.5 | 1.3 |
| Co.4 | 43 | 43 | 1.0 | 0.8 |
| Co.5 | 45 | 45 | 2.0 | 1.7 |

(remark) *2: in Comparative Examples 3 to 5, the water content is a value before and after washing.

In the resin composition pellets of EVOH obtained in Examples 5 to 9 of the present invention, sodium ions were washed and removed. The sodium ions may damage the long-run property and appearance, that is, inappropriate content of sodium ions may induce thermal deterioration, thermal decomposition and radical coloring at the time of melt molding. On the other hand, in Comparative Examples 3 to 5, in which EVOH pellets were immersed in the washing water and washed for the same time as in Examples 5 to 9, sodium ions were neither washed nor removed sufficiently.

Example 10

EVOH having an ethylene content of 32 mol %, the saponification degree of 99.5 mol %, the content of sodium ions of 1.5 weight % based on metal and the water content of 52 weight % was fed into a twin-screw extruder shown in FIG. 4 at the rate of 10 kg/hr (which includes the weight of water contained). The twin-screw extruder includes a raw material feeding portion, a washing water supply portion, a dewatering portion, and a minor component adding portion. The dewatering portion was provided with a wedge wire type dewatering slit. A circular strand die having a diameter of 3 mm and 5 holes was installed at the tip of the extruder. A 0.5 g/L aqueous solution of acetic acid was supplied from the washing water supply portion at the rate of 120 L/hr. An aqueous solution (shown in Table 8) of acetic acid/boric acid/sodium acetate/magnesium acetate/potassium dihydrogen phosphate was added from the minor component adding portion at the rate of 0.65 L/hr. The temperature of resin in the strand die was 105° C. The resin composition of EVOH right after being discharged from the strand die was cooled down in a water bath to be solidified. The solidified strand was cut with a pelletizer into columnar pellets having a diameter of 3 mm and the length of 4 mm. The water content of these pellets was 20 weight %. Table 7 shows the conditions of extrusion, and Table 8 shows the adding amount per unit time and composition of the adding solution. The following are the specifications of the twin-screw extruder.

| Type | Twin-screw extruder |
| --- | --- |
| L/D | 45.5 |
| Diameter | 30 mm $\phi$ |
| Screw | Complete meshing in the same direction |
| Dewatering portion | Dewatering slit |
| Rotation number | 300 rpm |
| Motor capacity | DC 22 KW |
| Heater | 13-parts split type |
| Number of dies hole | 5 holes (hole diamieter:3 mm $\phi$) |
| Speed of taking out resin | 5 m/min |

The obtained pellets were dried at 110° C. for 12 hours with a hot-air dryer to reduce the water content to 0.3 weight %. MI of the resin composition pellet of EVOH after drying was 1.5 g/10 min. Table 9 shows a composition of the dry pellets. Furthermore, when the dry pellets were formed into a film by using a single screw extruder and evaluated, gel and hard spots and coloring were evaluated as "A". Table 10 shows the evaluation results.

Comparative Example 6

Similar to Comparative Example 3, 0.7 kg of water-containing EVOH pellets having an ethylene content of 32 mol %, the saponification degree of 99.5 mol %, the water content of 40 weight % and the content of sodium ions of 1.5 weight % based on metal were immersed in 25 L of 0.5 g/L aqueous solution of acetic acid (30° C.) and washed for 5 minutes, corresponding to the retention time of the EVOH in the extruder. Thus, washed water-containing EVOH pellets (water content: 40 weight %) were obtained.

The EVOH pellets were immersed in 10 L of aqueous solution having a composition shown in Table 8 at 25° C. for 6 hours, followed by centrifuging the EVOH pellets. The resultant EVOH resin composition pellets were dried with a fluid type dryer at 80° C. for 3 hours to obtain the water content of 20 weight %, and then dried with a hot-air dryer at 110° C. for 12 hours to reduce the water content to 0.3 weight %. The dry pellets were subjected to the film formation test. Table 9 shows the composition and MI of the resin composition pellet of EVOH, and Table 10 shows the evaluation results.

TABLE 7

| | Ethylene content (mol %) | Saponification degree (mol %) | Feeding amount of EVOH *(kg/hr) | Water content (%) Before dewatering | Water content (%) After dewatering | Concentration of acetic acid (g/L) | Adding amount of washing water (g/L) |
|---|---|---|---|---|---|---|---|
| Ex. 10 | 32 | 99.5 | 10 | 52 | 20 | 0.5 | 120 |
| Co. 6 | 32 | 99.5 | — | 52 | — | 0.5 | — |

(remark) *amount of EVOH in a water-containing state

TABLE 8

| | Adding amount of liquid (L/hr) | Composition of adding liquid (g/L) | | | |
|---|---|---|---|---|---|
| | | Acetic acid | Boric acid | NaOAc | $NaH_2PO_4 \cdot 2H_2O$ |
| Ex.10 | 0.65 | 3.0 | 11 | 3.0 | 0.85 |
| Co.6 | 10* | 0.51 | 0.75 | 0.50 | 0.16 |

(remark) *: amount of liquid for immersing treatment

TABLE 9

| | MI (g/10 min) | Composition of dry pellets (ppm) | | | |
|---|---|---|---|---|---|
| | | Acetic acid | Boric acid | $Na^+$ | $PO_4^{3-}$ |
| Ex.10 | 1.5 | 316 | 233 | 127 | 70 |
| Co.6 | 1.5 | 209 | 227 | 116 | 73 |

TABLE 10

| | Evaluation results | |
|---|---|---|
| | Gel and hard spots | Coloring |
| Ex.10 | A | A |
| Co.6 | C | C |

According to Examples 5 to 10, it is possible to provide EVOH resin composition pellets having an excellent color resistance and reducing the occurrence of gel and hard spots formation and the amount of pellets attached to the die with the thermal deterioration or melt attachment of resin significantly suppressed. Furthermore, the present invention provides a process allowing at least one additive selected from carboxylic acid, a boron compound, a phosphoric acid compound, alkali metal salt, and alkali earth metal salt to be contained homogeneously in EVOH even in the case where it is difficult to precipitate a strand stably and to allow the additives to be contained in EVOH, because EVOH having less ethylene content and/or saponification degree was used, or EVOH was precipitated in the form of a strand at high speed in order to improve the productivity. Furthermore, in the process of allowing acid substances and/or metal salts to be contained in EVOH, it is possible to extremely reduce the discharging amount, thus providing a production process that is not require waste water treating equipment, equipment for adding acid materials and/or metal salts again, and equipment for removing impurities in the treating solution.

As mentioned above, the process for producing EVOH resin of Examples 5 to 10 of the present invention feeds the resin into the extruder, supplies the washing water from at least one place of the extruder, washes the resin, and discharges the washing water out of at least one place located downstream from the washing water supply portion, thereby removing the residue of saponification catalyst from water-containing and molten or semi-molten EVOH inside the extruder efficiently. Furthermore, it is possible to wash EVOH in a small space. Furthermore, since EVOH can be washed at a relatively low temperature, deterioration of the polymer can be prevented.

Example 11

EVOH having an ethylene content of 32 mol %, the saponification degree of 99.5 mol % and the water content of 52 weight % was added into a twin-screw extruder shown in FIG. 5, and extruded from a circular strand die having a diameter of 3 mm and 5 holes. The twin-screw extruder includes a raw material feeding portion and a dewatering portion. The dewatering portion was provided with a wedge wire type dewatering slit. The temperature of the resin at the discharge portion was set to be 105° C. The EVOH right after being discharged from the strand die was cooled down in a water bath to be solidified. The solidified strand was cut into columnar pellets having a diameter of 3 mm and a length of 4 mm with a pelletizer.

The feeding amount of EVOH per unit time was 10 kg/hr (which includes the weight of water contained), and the amount of water to be removed per unit time was 4.00 kg/hr. Table 11 shows the conditions of extrusion, and Table 12 shows the evaluation results. Furthermore, the following are the specifications of the twin-screw extruder.

| Type | Twin-screw extruder |
|---|---|
| L/D | 45.5 |
| Diameter | 30 mm φ |
| Screw | Complete meshing in the same direction |
| Dewatering portion | Dewatering slit |
| Rotation number | 300 rpm |
| Motor capacity | DC22KW |
| Heater | 13-part split type |
| Number of dies holes | 5 hoes (hole diameter:3 mm φ) |
| Speed of taking out resin | 5 m/min |

The water content of the resin composition pellets of EVOH after being discharged from the extruder was 20 weight %. The melt attachment rate of the pellets was 0%.

Examples 12 and 13

EVOH pellets were produced in the same manner as in Example 11 except that an ethylene content, the saponification degree, resin temperature, the water content before adding into the twin-screw extruder and the water content after being discharged from the extruder were changed as shown in Table 1. Table 11 shows the conditions of extrusion, and Table 12 shows evaluation results.

Example 14

EVOH pellets were produced in the same manner as in Example 11 except that the dewatering portion employs an open vent instead of the dewatering slit. The resultant pellets were subjected to the melt attachment test. Table 11 shows the conditions of extrusion, and Table 12 shows evaluation results.

Comparative Example 7

EVOH pellets having an ethylene content of 32 mol %, the saponification degree of 99.5 mol % and the water content of 52 weight % was dried at 80° C. for 3 hours by using a fluid type dryer to obtain the water content of 20 weight %. The melt attachment rate of the resultant pellets was measured by the same manner as in Example 11. Table 12 shows the evaluation results.

Comparative Examples 8 and 9

EVOH pellets were produced in the same manner as in Comparative Example 7 except that an ethylene content of EVOH pellet, the saponification degree, and the water content were changed as shown in Table 11. Table 12 shows evaluation results.

of 0.65 L/hr. At this time, water was discharged from the dewatering portion at the rate of 4.65 kg/hr. The temperature of resin in the strand die was 105° C. The EVOH resin composition right after being discharged from the strand die was cooled down in a water bath to be solidified. The solidified strand was cut into columnar pellets having a diameter of 3 mm and the length of 4 mm with a pelletizer. The water content of the pellets was 20 weight %. Table 13 shows the conditions of extrusion, and Table 14 shows the adding amount per unit time and the composition of the adding solution. The following are the specifications of the twin-screw extruder.

| Type | Twin-screw extruder |
|---|---|
| L/D | 45.5 |
| Diameter | 30 mm φ |
| Screw | Complete meshing in the same direction |
| Rotation number | 300 rpm |

TABLE 11

| | Ethylene content (mol %) | Saponification degree (%) | Temperature of resin (° C.) | Feeding amount of EVOH (kg/hr) | Amount of water discharged (kg/hr) | Water content Before feeding into extruder (wt %) | Water content After discharged from extruder (wt %) |
|---|---|---|---|---|---|---|---|
| Ex. 11 | 32 | 99.5 | 105 | 10 | 4.00 | 52 | 20 |
| Ex. 12 | 55 | 95.0 | 105 | 10 | 3.33 | 40 | 10 |
| Ex. 13 | 10 | 99.0 | 150 | 8 | 1.12 | 20 | 7 |
| Ex. 14 | 32 | 99.5 | 105 | 10 | 4.00 | 52 | 20 |
| Co. 7 | 32 | 99.5 | — | — | — | 52 | 20 |
| Co. 8 | 55 | 95.0 | — | — | — | 40 | 10 |
| Co. 9 | 10 | 99.0 | — | — | — | 20 | 7 |

TABLE 12

| | Evaluation results Rate of melt attachment (%) |
|---|---|
| Example 11 | 0 |
| Example 12 | 0 |
| Example 13 | 0 |
| Example 14 | 0 |
| Comparative Example 7 | 3 |
| Comparative Example 8 | 13 |
| Comparative Example 9 | 2 |

Example 15

EVOH having an ethylene content of 32 mol %, the saponification degree of 99.5 mol % and the water content of 52 weight % was fed into a twin-screw extruder shown in FIG. 6 at the rate of 10 kg/hr (which includes the weight of water contained). The twin-screw extruder includes a raw material feeding portion, a dewatering portion and a minor component adding portion. The dewatering portion was provided with a wedge wire type dewatering slit. A circular strand die having a diameter of 3 mm and 5 holes was installed at the tip of the extruder. An aqueous solution (shown in Table 14) of acetic acid/boric acid/sodium acetate/magnesium acetate/potassium dihydrogen phosphate was added from the minor component adding portion at the rate -continued

| Motor capacity | DC 22 KW |
|---|---|
| Heater | 13-part split type |
| Number of dies hole | 5 holes (hole diameter: 3 mm φ) |
| Speed of taking out resin | 5 m/min |

The melt attachment rate of the obtained pellets was 0%. The pellets were dried at 110° C. for 12 hours with a hot-air dryer to reduce the water content to 0.3 weight %. MI of the resin composition pellet of EVOH after dried was 1.5 g/10 min. Table 15 shows a composition of the dry pellets. Furthermore, when the dry pellets were formed into a film by using a single screw extruder and the film was evaluated, gel and hard spots and coloring were evaluated as "A". Table 16 shows the evaluation results.

Examples 16 and 17

EVOH pellets of the resin composition were produced in the same manner as in Example 15 except that an ethylene content of EVOH, the saponification degree, die temperature, the feeding amount of EVOH per unit time, the water content before adding into the twin-screw extruder and the water content right after being discharged from the extruder were changed as shown in Table 13 and the amount placed per unit time and composition of the additives made of an aqueous solution acetic acid/boric acid/sodium acetate or calcium acetate/sodium dihydrogen phosphate or potassium dihydrogen phosphate were changed as shown in Table 14. The thus obtained pellets were evaluated. Table 13 shows the conditions of extrusion, Table 14 shows the composition of additive solution, Table 15 shows a composition of pellets of EVOH resin composition and Table 16 shows evaluation results.

Example 18

EVOH pellets were produced in the same manner as in Example 15 except that the dewatering portion employs a barrel having a vacuum vent-port instead of the barrel having the dewatering slit. The melt attachment and film formation were evaluated. Table 13 shows the conditions of extrusion, Table 14 shows the composition of the additive solution, Table 15 shows the composition of pellets of resin composition of EVOH, and Table 16 shows the evaluation results.

Comparative Example 10

EVOH pellets having an ethylene content of 32 mol %, the saponification degree of 99.5 mol % and the water content of 52 weight % were immersed in a 10 L aqueous solution having a composition shown in Table 14 for 6 hours, followed by centrifuging thereof. The resultant pellets of resin composition of EVOH were dried at 80° C. for 3 hours with a fluid type dryer to obtain the water content of 20 weight %. The melt attachment rate of the dry pellets was measured by the same manner as in Example 15. Thereafter, the dry pellets were dried at 110° C. for 12 hours with a hot-air dryer to reduce the water content to 0.3 weight %. The evaluation of the film formation of the dry pellets was made. Table 15 shows the composition of the resin composition pellet of EVOH and MI of the pellets, and Table 16 shows the evaluation results.

Comparative Examples 11 and 12

EVOH pellets of the resin composition were produced in the same manner as in Comparative Example 10 except that an ethylene content of EVOH, the saponification degree, and the water content were changed as shown in Table 13, and the composition of the treating solution, for which the EVOH was immersed, made of an aqueous solution acetic acid/boric acid/sodium acetate or calcium acetate/sodium dihydrogen phosphate or potassium dihydrogen phosphate was changed as shown in Table 14. The resultant pellets were evaluated. Table 15 shows a composition of pellets of EVOH resin composition and Table 16 shows evaluation results.

TABLE 13

| | Ethylene content (mol %) | Saponification degree (%) | Feeding amount of EVOH (kg/hr) | Amount of water discharged (kg/hr) | Water content Before feeding into extruder (wt %) | Water content After discharged from Extruder (wt %) |
|---|---|---|---|---|---|---|
| Ex.15 | 32 | 99.5 | 10 | 4.65 | 52 | 20 |
| Ex.16 | 55 | 95.0 | 10 | 3.44 | 40 | 15 |
| Ex.17 | 10 | 99.0 | 8 | 1.13 | 20 | 12 |
| Ex.18 | 32 | 99.5 | 10 | 4.65 | 52 | 20 |
| Co.10 | 32 | 99.5 | — | — | 52 | 20 |
| Co.11 | 55 | 95.0 | — | — | 40 | 15 |
| Co.12 | 10 | 99.0 | — | — | 20 | 12 |

TABLE 14

| | Amount of adding liquid L/hr | Composition of additives (g/L) | | | | | |
|---|---|---|---|---|---|---|---|
| | | Acetic acid | Boric acid | NaOAc | $Ca(OAc)_2.H_2O$ | $NaH_2PO_4.2H_2O$ | $NH_2PO_4$ |
| Ex. 15 | 0.65 | 3.0 | 11 | 3.0 | — | 0.85 | — |
| Ex. 16 | 0.40 | 0.5 | 13 | — | 1.1 | 0.53 | — |
| Ex. 17 | 0.35 | 4.0 | 21 | 2.9 | — | — | 1.1 |
| Ex. 18 | 0.65 | 3.0 | 11 | 3.0 | — | 0.85 | — |
| Co. 10 | 10* | 0.51 | 0.75 | 0.50 | — | 0.16 | — |
| Co. 11 | 15* | 0.07 | 0.56 | — | 0.18 | 0.09 | — |
| Co. 12 | 20* | 1.1 | 0.65 | 0.77 | — | — | 0.31 |

(remark) *amount of liquid for immersing treatment

TABLE 15

| | MI (g/10 min) | Composition of additives in dry pellet (ppm) | | | | |
|---|---|---|---|---|---|---|
| | | Acetic acid | Boric acid | $Na^+$ | $Ca^{2+}$ | $PO_4^{3-}$ |
| Ex.15 | 1.5 | 316 | 233 | 127 | — | 70 |
| Ex.16 | 1.8 | 30 | 176 | 7 | 21 | 27 |
| Ex.17 | 1.5 | 199 | 206 | 51 | — | 48 |
| Ex.18 | 1.5 | 301 | 230 | 119 | — | 73 |
| Co.10 | 1.5 | 209 | 227 | 116 | — | 73 |
| Co.11 | 1.8 | 32 | 170 | 8 | 24 | 29 |
| Co.12 | 1.5 | 188 | 211 | 52 | — | 50 |

TABLE 16

| | Evaluation results | | |
|---|---|---|---|
| | Gel and hard spots | Coloring | Rate of melt attachment (%) |
| Example 15 | A | A | 0 |
| Example 16 | A | A | 0 |
| Example 17 | B | B | 0 |
| Example 18 | A | A | 0 |
| Comparative Example 10 | C | C | 4 |
| Comparative Example 11 | C | B | 13 |
| Comparative Example 12 | | D | 8 |

According to Examples 5 to 10, it is possible to provide EVOH resin composition pellets having an excellent color resistance and reducing the occurrence of gel and hard spots and the amount of pellets attached to the die with the thermal deterioration or melt attachment of resin radically suppressed. Furthermore, the present invention provide a process of allowing at least one additive selected from carboxylic acid, a boron compound, a phosphoric acid compound, alkali metal salt, and alkali earth metal salt to be contained homogeneously in EVOH even in the case where it is difficult to precipitate strand stably and to allow the additives to be contained in EVOH, because EVOH having less ethylene content and/or saponification degree was used, or EVOH was precipitated in the form of a strand at high speed in order to improve the productivity. Furthermore, in the producing process of allowing acid substances and/or metal salts to be contained in EVOH, it is possible to extremely reduce the discharge amount, thus providing a producing method that does not require waste water treatment equipment, equipment for adding acid materials and/or metal salts again, and equipment for removing impurities in the treating solution.

As mentioned above, according to Examples 11 to 18 of the present invention, water can be removed effectively by discharging liquid water and/or vapor water from the water containing EVOH resin in at least one place inside the extruder. Furthermore, after the water content of EVOH resin was adjusted, the additives can be added inside the extruder effectively.

In addition, as compared with the conventional drying method with a hot-air dryer, the deterioration due to heat or coloring at the time of drying is small and melt attachment between pellets or between the pellet and the inner wall of the device can be avoided. Furthermore, when it is difficult to allow the strand to precipitate, for example, when EVOH having a low ethylene contents and/or saponification degree is used, or when the high speed strand precipitation was performed in order to improve the productivity, the present invention can provide a process capable of uniform drying. Thereby, it is possible to produce the products of high quality in a case of using EVOH having a low ethylene content and/or the saponification degree, and to improve the productivity. Example 19

EVOH having an ethylene content of 32 mol %, the saponification degree of 90.5 mol % and the water content of 40 weight % was supplied into a twin-screw extruder having one dewatering slit shown in FIG. 7, at the rate of 42 kg/hr, and the water from EVOH was removed in the form of liquid water or vapor water to reduce the water content to 23 weight %. Thereafter, EVOH was extruded from the dies having six holes, each having a diameter of 3 mm, installed at the tip of the extruder. The molten product was cut with a hot cutter (FIGS. 8 and 9) having four blades at the portion separated a distance of 0.05 mm from the dies. The resin temperature at this time was 110° C. The flow rate of circulating water of the cutter was 30 liter/min.

The discharge linear velocity from the dies at this time was 21 m/min, the rotation number of the blade was 1200 rpm, and the peripheral speed was 7.5 m/sec.

The shape of the pellets obtained in this process was a sphere pressed and uniaxially crushed (disk shape or flat sphere shape). The diameter thereof seen from the front was 3.3 mm, and the thickness seen from the cross-section was 2.6 mm. The pellet was evaluated by the following methods. Table 17 shows the results.

(Specifications of Extruder Used for Evaluation)

| Type | Twin-screw extruder |
|---|---|
| L/D | 42 |
| Diameter | 47 mm φ |
| Screw | Complete meshing in the same direction |
| Rotation number | 450 rpm |
| Cylinder temperature | 95° C. |
| Dies temperature | 120° C. |
| Number of dies holes | 6 holes |

(Evaluation of Pellet Size)

The diameters and length of 100 pellets were measured with a caliper. The percentage of the pellets falling in the range of the diameter of 3.3±0.2 mm and the thickness of 2.6±0.2 mm was determined. The evaluation was based on the following.

○: 90% or more

Δ: 70% or more and less than 90%

×: less than 70%

Example 20

The pellets produced using EVOH having an ethylene content of 20 mol %, the saponification degree of 99.5 mol % and the water content of 40 weight % by the same method as in Example 19 were evaluated in terms of the accuracy of cutting pellets. Table 17 shows results.

Example 21

The pellets produced using EVOH having an ethylene content of 20 mol %, the saponification degree of 90.0 mol % and the water content of 40 weight % by the same method as in Example 19 were evaluated in terms of the accuracy of cutting pellets. Table 17 shows results.

Comparative Example 13

Columnar pellets were obtained in the same manner as in Example 19 except that the resin was extruded into a cooling bath in the form of strand from a strand die and strands were cut with a strand cutter instead of hot-cutting the molten state resin extruded from the extruder. The strand die is provided with five holes, each having an outer diameter of 3.3 mm, arranged horizontally. The resultant pellets were evaluated in terms of the cutting accuracy. Table 17 shows the results.

The diameters and length of 100 pellets, obtained by cutting with a strand cutter, were measured with a caliper. The number of the pellets falling within the range of a diameter of 3.3 mm 0.2 mm, and a thickness of 3.5 mm±0.2 mm was determined. The cutting accuracy was determined in accordance with the percentage satisfying the above-mentioned range as follows.

○: 90% or more

Δ: 70% or more and less than 90%

×: less than 70%

Comparative Example 14

Columnar pellets were produced in the same manner as in Example 20 except that the cutting method as in Comparative Example 13 was employed. The resultant pellets were evaluated in terms of the cutting accuracy. Table 17 shows the results.

Comparative Example 15

Columnar pellets were produced in the same manner as in Example 21 except that the cutting method as in Comparative Example 13 was employed. The resultant pellets were evaluated in terms of the cutting accuracy. Table 17 shows the results.

TABLE 17

|   | Cutting accuracy | Water content (wt %) Raw material | After cutting | remark |
|---|---|---|---|---|
| Ex.19 | ○ | 40 | 23 | No problems |
| Ex.20 | ○ | 40 | 28 | No problems |
| Ex.21 | ○ | 40 | 22 | No problems |
| Co.13 | Δ | 40 | 22 | Strands sometimes cut off |
| Co.14 | X | 40 | 28 | Strands frequently cut off |
| Co.15 | X | 40 | 21 | Strands frequently cut off |

As is apparent from Table 17, since in Examples 19 to 21, EVOH resin was cut by the hot cutting method, the cutting accuracy was good and the cutting property does not suffer from any problems. On the other hand, in Comparative Examples 13 to 15, after polymer was extruded in the form of a strand in the cooling bath, the resin was cut with a strand cutter. There were problems in terms of the cutting accuracy and cutting property.

As mentioned above, in Examples 19 to 21 of the present invention, a water-containing and molten state EVOH resin is extruded from the discharge portion, and cut in the molten state. Thus, a large amount of polymer can be cut effectively in a short time.

Example 22

45% methanol solution of ethylene-vinyl acetate copolymer having an ethylene content of 32 weight % was placed in a saponification reactor, a sodium hydroxide/methanol solution (80 g/L) was added thereto so as to be 0.4 chemical equivalent with respect to a vinyl acetate component in the copolymer, and methanol was added thereto so as to adjust the concentration of the copolymer to 20%. The temperature was raised to 60° C. and reaction was performed for about 4 hours while blowing nitrogen gas into the reactor. After 4 hours, the reacted product was neutralized with acetic acid to stop the reaction. Furthermore, water corresponding to 55 weight % of whole amount of methanol was added so as to obtain a solution of methanol of EVOH, having an ethylene content of 32 weight %, saponification degree of 99.5%, and water. The EVOH solution was precipitated in the form of a strand by extruding the solution into water from a metal mold having a circular opening. The precipitated product was cut into pellets having a diameter of about 3 mm and a length of about 5 mm. The resultant pellets were subjected to repeated treatment in which a large amount of water was added and then dewatered therefrom. 10 kg of dewatered pellets was centrifuged to remove the surface water. The percentage of the surface water of the thus obtained pellets was 0 weight %.

EVOH having an ethylene content of 32 mol %, the saponification degree of 99.5 mol % and the water content of 33 weight % was fed into a twin-screw extruder shown in FIG. 10. The resin temperature at the discharge portion was 100° C. A treating solution made of an aqueous solution of acetic acid/boric acid/sodium acetate/magnesium acetate/ potassium dihydrogen phosphate was added from the minor component adding portion (408) as shown in FIG. 10. The feeding amount of EVOH per unit time was 10 kg/hr (which includes water contained). The added amount of treatment liquid was 0.67 L/hr. The treating solution had a composition including 4.3 g/L of acetic acid, 15 g/L of boric acid, 4.6 g/L of sodium acetate, 3.0 g/L of magnesium acetate, and 1.4 g/L of potassium dihydrogen phosphate. The following are the specifications of the twin-screw extruder. In the raw material feeding continuous test, no extruding defect was observed in 8 hours continuous operation.

<Raw Material Feeding Continuous Test>
Volumetric Single Screw Feeder
  Treating Amount: 10 kg/hr (capability: 4 to 20 kg/hr)
  hopper: 30L
  drive: 0.4 KW
<Extruder>

| Type | Twin-screw extruder |
|---|---|
| L/D | 45.5 |
| Diameter | 30 mm φ |
| Screw | Complete meshing in the same direction |
| Rotation number | 300 rpm |
| Motor capacity | DC 22 KW |
| Heater | 13-part split type |
| Number of dies holes | 5 holes (hole diameter: 3 mm φ) |
| Temperature of resin in dies | 105° C. |
| Speed of taking out resin | 5 m/min |

The water content of pellets of EVOH resin composition after being discharged from the extruder was 20 weight %. After the obtained pellets were dried at 100° C. for 15 hours with a fluid type dryer and then dried at 100° C. for 15 hours by using a ventilation dryer, the water content was 0.3 weight %. Furthermore, MI was 1.5 g/10 min.

A single layer film of EVOH was formed of the resultant dry pellets and examined for gel and hard spots and coloring.

In the examination of gel and hard spots and a color resistance was evaluated as "A".

Furthermore, the resin pellets are not bridged inside the hopper of the feeder. The raw material resins could be fed stably into the extruder. Furthermore, since the amount of surface water of the pellet is small, the water vapor was not generated at the lower portion of the hopper, raw materials are not melted, and raw material pellets can be fed stably into the extruder. Therefore, the added amount of acid and/or metal slat is stable, and the thermal property was not deteriorated. Table 18 shows the conditions of extrusion, Table 19 shows the composition of treated liquid, and Table 20 shows evaluation results.

Example 23

EVOH pellets were produced in the same manner as in Example 1 except that an ethylene content, the saponification degree, resin temperature, the water content before adding into the twin-screw extruder and the water content after being discharged from the extruder were changed as shown in Table 18, and the amount of EVOH to be placed per unit time and the amount of a solution of at least one selected from the group consisting of carboxylic acid, a boron compound, a phosphoric acid compound, alkali metal salt, and alkali earth metal salt are changed as shown in Table 19. Table 18 shows the conditions of extrusion, Table 19 shows the composition of treating solution, and Table 20 shows evaluation results.

Furthermore, the resin pellets were not bridged inside the hopper of the feeder. The raw material resins could be fed stably into the extruder. Furthermore, since the amount of surface water of the pellet is small, the water vapor was not generated at the lower portion of the hopper, raw materials were not melted, and raw material pellets could be fed stably into the extruder. Therefore, the added amount of acid-metal slat is stable, and the thermal property was not deteriorated.

Comparative Example 16

45% methanol solution of ethylene-vinyl acetate copolymer having an ethylene content of 32 weight % was placed in a saponification reactor, a sodium hydroxide/methanol solution (80 g/L) was added thereto so as to be 0.4 equivalent with respect to a vinyl acetate component of the copolymer, and methanol was added thereto so as to adjust the concentration of the copolymer to 20%. The temperature was raised to 60° C. and reaction was performed for about 4 hours while blowing nitrogen gas into the reactor. After 4 hours, the reacted product was neutralized with acetic acid to stop the reaction. Furthermore, water was supplied thereto, and a solution of methanol, water and EVOH having an ethylene content of 32 weight % and saponification degree of 99.5% was obtained. The EVOH solution was precipitated in the form of a strand by extruding the solution into water from a metal mold having circular holes. The precipitated product was cut into pellets having a diameter of about 3 mm and the length of about 5 mm. The obtained pellets were dewatered with a centrifugal separator. Furthermore, an operation in which a large amount water is supplied to the pellets and again dewatered with a centrifugal separator was repeated. The water percentage of the surface water of the resultant pellets was 30 weight % and the water content was 65 weight %.

When the resultant pellets were subjected to the raw material feeding continuous test, 0.5 hours later, they were bridged at the lower part of the hopper, and the operation was stopped. Furthermore, when the obtained pellets were formed into films, the appearance was extremely poor, that is, gel and hard spots were much observed, and coloring occurred. Table 18 shows the conditions of extrusion, Table 19 shows the treatment solution and Table 20 shows the evaluation results.

TABLE 20

| | Raw material feeding continuous test | Quality of formed film | |
|---|---|---|---|
| | Continuous operation time (hr) | Gel and hard spots | Coloring |
| Ex.22 | >8 | A | A |
| Ex.23 | >8 | A | B |
| Co.16 | 0.5 | C | C |

As mentioned above, according to Examples 22 and 23, the following advantages are attained.

(1) It is possible to prevent the raw materials from being bridged in the hopper inside the extruder and to feed the raw materials into the extruder.

(2) Since the amount of surface water of the pellet is small, no water vapor is generated at the lower part of the hopper, and thus the raw material is not melt-attached.

(3) Since the raw material pellets are fed into the extruder, the added amount of acid and/or metal salt is stable. Thereby, the thermal stability is not deteriorated.

As mentioned above, Examples 22 to 23 of the present invention illustrate a method of melt kneading the water-containing EVOH resin. By feeding the pellets into the extruder with the water content of the entire pellets of the resin set to be 0.5 to 70 weight % and the surface water content set to be less than 10 weight %, the pellets can be fed into the extruder effectively.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

TABLE 18

| | Ethylene content (mol %) | Saponification degree (%) | Feeding amount of EVOH *1 (kg/hr) | Adding amount of treating solution (L/hr) | Temperature of resin in extruder (° C.) | Water content of resin surface (%) | Water content (%) | |
|---|---|---|---|---|---|---|---|---|
| | | | | | | | Before feeding into extruder (wt %) | Right after discharged from extruder (wt %) |
| Ex. 22 | 32 | 99.5 | 10.0 | 0.67 | 100 | 0 | 33 | 20 |
| Ex. 23 | 32 | 99.5 | 11.4 | 0.67 | 120 | 8 | 41 | 20 |
| Co. 16 | 32 | 98.5 | 19.1 | 0.67 | 120 | 30 | 65 | 20 |

*1: weight of EVOH in a water-containing state

TABLE 19

| | Acetic acid (g/L) | Boric acid (g/L) | Phosphoric acid compound (g/L) | Alkali metal salt (g/L) | Alkali earth metal salt (g/L) |
|---|---|---|---|---|---|
| Ex.22 | 4.3 | 15 | $KH_2PO_4$ 1.4 | NaOAc 4.6 | $Mg(OAc)_2$ 3.0 |
| Ex.23 | 7.2 | — | $KH_2PO_4$ 1.6 | NaOAc 17.8 | $Ca(OAc)_2$ 4.0 |
| Co.16 | 7.2 | — | $KH_2PO_4$ 1.6 | NaOAc 17.8 | $Ca(OAc)_2$ 4.0 |

What is claimed is:

1. A process for producing an ethylene-vinyl alcohol copolymer resin, comprising feeding an ethylene-vinyl alcohol copolymer into an extruder to form a molten resin, keeping the temperature of the molten resin in the extruder at 70 to 170° C., adding at least one additive selected from the group consisting of a carboxylic acid, a boron compound, a phosphoric acid compound, an alkali metal salt, and an alkali earth metal salt to the molten resin in the extruder, adjusting an amount of water present in the extruder by supplying or removing water, and discharging the resin from the extruder, wherein the resin has a water content right after being discharged of 5 to 40 weight %.

2. The process according to claim 1, comprising adding at least one carboxylic acid selected from the group consisting of acetic acid and lactic acid.

3. The process according to claim 1, wherein the additive is added in the form of an aqueous solution.

4. The process according to claim 1, further comprising washing the ethylene-vinyl alcohol copolymer with washing water, and discharging the washing water in a liquid state from at least one place downstream from a washing water supply portion of the extruder, to remove a residue of a saponification catalyst present in the copolymer.

5. The process according to claim 4, wherein the residue of a saponification catalyst is an alkali metal ion and the content of the ion is 0.1 to 5 weight % based on the metal.

6. The process according to claim 4, wherein the washed ethylene-vinyl alcohol copolymer comprises 0.05 weight % or less of an alkali metal ion based on metal.

7. The process according to claim 4, wherein the washing water is an aqueous solution of an acid having pKa of 3.5 or more at 25° C.

8. The process according to claim 1, wherein adjusting the amount of water includes removing liquid water or vapor water, from at least one place of the extruder.

9. The process according to claim 8, wherein the water is removed with at least one selected from the group consisting of a dewatering slit and a dewatering hole.

10. The process according to claim 1, comprising feeding a pellet of the copolymer into the extruder while keeping the entire water bontent of the pellet at the time of feeding into the extruder at 0.5 to 70 weight %, and the surface water content of the pellet of the copolymer at less than 10 weight %.

11. The process according to claim 10, wherein the feeding is a volumetric feeding comprising feeding the pellet into the extruder with a volumetric feeder.

12. The process according to claim 1, wherein the temperature of the molten resin inside the extruder is from 90 to 140° C.

13. The process according to claim 1, wherein the water content of the resin composition right after discharging is from 15 to 30 weight %.

14. The process according to claim 1, wherein an ethylene content in the ethylene-vinyl alcohol copolymer is from 3 to 70 mol %, and the saponification degree is from 80 to 100 mol %.

15. A process for producing ethylene-vinyl alcohol copolymer resin pellets, comprising feeding an ethylene-vinyl alcohol copolymer into an extruder to form a molten resin, keeping the temperature of the resin in the extruder at 70 to 170° C., adding at least one additive selected from the group consisting of a carboxylic acid, a boron compound, a phosphoric acid compound, an alkali metal salt, and an alkali earth metal salt to the molten resin in the extruder, adjusting an amount of water by supplying or removing water in the extruder, discharging the resin from the extruder, wherein the resin has a water content right after being discharged of from 5 to 40 weight %, cutting the discharged ethylene-vinyl alcohol copolymer resin, and drying the cut copolymer resin until the water content is 1 weight % or less.

16. The process according to claim 15, wherein the resin is cut in a molten state.

17. The process according to claim 15, wherein cutting is selected from the group consisting of a hot-cut method and an under-water cut method.

18. An ethylene-vinyl alcohol copolymer resin pellet, produced by feeding an ethylene-vinyl alcohol copolymer into an extruder to form a molten resin, keeping the temperature of the molten resin in the extruder at 70 to 170° C., adding at least one additive selected from the group consisting of a carboxylic acid, a boron compound, a phosphoric acid compound an alkali metal salt, and an alkali earth metal salt to the molten resin in the extruder, adjusting an amount of water present in the extruder by supplying or removing water, discharging the resin from the extruder, wherein the resin has a water content right after being discharged of 5 to 40 weight %, and then cutting the discharged ethylene-vinyl alcohol copolymer resin to form resin pellets and drying the resin pellets until the water content is 1 weight % or less, wherein no spherocrystals are observed in the center of the cross section of the resin pellet when the cross section is observed with a polarization microscope having a magnification of 600.

19. An ethylene-vinyl alcohol copolymer resin pellet, produced by feeding an ethylene-vinyl alcohol copolymer into an extruder to form a molten resin, keeping the temperature of the molten resin in the extruder at 70 to 170° C., adding at least one additive selected from the group consisting of a carboxylic acid, a boron compound, a phosphoric acid compound, an alkali metal salt, and an alkali earth metal salt to the molten resin in the extruder, adjusting an amount of water present in the extruder by supplying or removing water, discharging the resin from the extruder, wherein the resin has a water content right after being discharged of 5 to 40 weight %, and then cutting the discharged ethylene-vinyl alcohol copolymer resin to form resin pellets and drying the resin pellets until the water content is 1 weight % or less, wherein the angle of repose is 23° or less when the resin pellets are piled.

20. The ethylene-vinyl alcohol copolymer resin pellet according to claim 18, wherein the additive is at least one carboxylic acid selected from the group consisting of acetic acid and lactic acid.

21. The ethylene-vinyl alcohol copolymer resin pellet according to claim 18, wherein the content of an alkali metal ion contained in the resin pellets is 0.05 weight % or less based on the metal.

22. The ethylene-vinyl alcohol copolymer resin pellet according to claim 18, wherein an ethylene content in the ethylene-vinyl alcohol copolymer is in the range of 3 to 70 mol %, and the saponification degree is in the range of 80 to 100 mol %.

23. The ethylene-vinyl alcohol copolymer resin pellet according to claim 19, wherein the additive is at least one carboxylic acid selected from the group consisting of acetic acid and lactic acid.

24. The ethylene-vinyl alcohol copolymer resin pellet according to claim 19, wherein the content of an alkali metal ion contained in the resin pellets is 0.05 weight % or less based on the metal.

25. The ethylene-vinyl alcohol copolymer resin pellet according to claim 19, wherein an ethylene content in the ethylene-vinyl alcohol copolymer is in the range of 3 to 70 mol %, and the saponification degree is in the range of 80 to 100 mol %.

* * * * *

UNITED STATES PATENT AND TRADEMARK OFFICE
CERTIFICATE OF CORRECTION

PATENT NO. : 6,686,405 B1
DATED : February 3, 2004
INVENTOR(S) : Takaharu Kawahara et al.

It is certified that error appears in the above-identified patent and that said Letters Patent is hereby corrected as shown below:

Column 45,
Line 38, "bontent" should read -- content --.

Signed and Sealed this

Twenty-fifth Day of May, 2004

JON W. DUDAS
*Acting Director of the United States Patent and Trademark Office*